(12) United States Patent
Valle

(10) Patent No.: US 12,462,283 B2
(45) Date of Patent: Nov. 4, 2025

(54) CERTIFICATION OF FAN STATUS AND CORRESPONDING MARKETPLACE FOR DIGITAL COLLECTIBLES

(71) Applicant: Forever Fan Corporation, Mexico City (MX)

(72) Inventor: Jose Ramon Lopez Valle, Mexico City (MX)

(73) Assignee: Forever Fan Corporation, Mexico City (MX)

( * ) Notice: Subject to any disclaimer, the term of this patent is extended or adjusted under 35 U.S.C. 154(b) by 391 days.

(21) Appl. No.: 17/862,969

(22) Filed: Jul. 12, 2022

(65) Prior Publication Data

US 2023/0026561 A1    Jan. 26, 2023

Related U.S. Application Data

(60) Provisional application No. 63/221,688, filed on Jul. 14, 2021.

(51) Int. Cl.
| | |
|---|---|
| *G06Q 50/00* | (2024.01) |
| *G06Q 30/018* | (2023.01) |
| *G06Q 30/0601* | (2023.01) |
| *H04L 9/00* | (2022.01) |
| *H04L 67/306* | (2022.01) |
| *G06Q 40/04* | (2012.01) |

(52) U.S. Cl.
CPC ....... *G06Q 30/0601* (2013.01); *G06Q 30/018* (2013.01); *G06Q 50/01* (2013.01); *H04L 9/50* (2022.05); *H04L 67/306* (2013.01); *G06Q 40/04* (2013.01); *G06Q 2220/00* (2013.01)

(58) Field of Classification Search
CPC .. G06Q 30/0601; G06Q 30/018; G06Q 50/01; H04L 67/306
See application file for complete search history.

(56) References Cited

U.S. PATENT DOCUMENTS

| | | |
|---|---|---|
| 8,651,370 B1 | 2/2014 | Mudrick et al. |
| 10,516,658 B2 | 12/2019 | Rappaport |
| (Continued) | | |

FOREIGN PATENT DOCUMENTS

WO    2021022000 A1    2/2021

OTHER PUBLICATIONS

Nasdaq OMX | GlobeNewswire. "WiseKey's WIShelter App Now Includes a Messing Service Allowing Secure Mobile Communication Between Authenticated and Trusted Users". [New York] Jan. 11, 2021 (Year: 2021).*

(Continued)

*Primary Examiner* — Laura Yesildag
(74) *Attorney, Agent, or Firm* — NEO IP

(57) ABSTRACT

The present invention is related to systems and methods for creating, validating, updating, and certifying fan status. The present invention is directed to creating a platform for fan communications and engagement. The present invention also includes a marketplace for transacting digital collectibles of interest to fans. Fan status in the present invention is a metric of social interaction, engagement, time spent, money spent, events attended, and/or other ways of measuring support and interest. Both quantitative and qualitative measures of fan status are compatible with the present invention. Preferably, the fan status is used for fans of sports teams.

7 Claims, 31 Drawing Sheets

(56) References Cited

U.S. PATENT DOCUMENTS

| | | |
|---|---|---|
| 11,048,768 B1 | 6/2021 | Kolbert et al. |
| 11,238,476 B2 | 2/2022 | Koenig et al. |
| 11,769,140 B2 | 9/2023 | Fowler et al. |
| 2006/0155659 A1 | 7/2006 | DiCesare |
| 2007/0278784 A1 | 12/2007 | Aragon |
| 2008/0262926 A1 | 10/2008 | Spriegel et al. |
| 2013/0117156 A1 | 5/2013 | Azmi et al. |
| 2013/0262332 A1 | 10/2013 | Moon et al. |
| 2013/0317868 A1 | 11/2013 | Diamond et al. |
| 2014/0330629 A1 | 11/2014 | Beadles |
| 2015/0350309 A1* | 12/2015 | Wildern, IV ....... H04N 21/8352 709/219 |
| 2016/0104181 A1* | 4/2016 | Das ..................... G06Q 50/01 705/7.33 |
| 2017/0069024 A1 | 3/2017 | Dupoteau |
| 2018/0192144 A1* | 7/2018 | McElroy ............ H04N 21/8456 |
| 2019/0180388 A1* | 6/2019 | Bokestad ............... G06Q 50/01 |
| 2020/0193464 A1 | 6/2020 | Koenig et al. |
| 2020/0342547 A1 | 10/2020 | Haith |
| 2021/0192620 A1 | 6/2021 | Golomb |
| 2022/0240062 A1* | 7/2022 | Gurayah ............... H04W 12/02 |
| 2022/0253755 A1 | 8/2022 | Cocanougher et al. |
| 2022/0309491 A1* | 9/2022 | Shapiro ................. G06F 21/64 |

OTHER PUBLICATIONS

Sharma, Tanusree, et al. ""It's a Blessing and a Curse": Unpacking Creators' Practices with Non-Fungible Tokens (NFTs) and Their Communities." arXiv preprint arXiv:2201.13233 (2022). (Year: 2022).*

* cited by examiner

CERTIFICATION OF FAN STATUS AND CORRESPONDING MARKETPLACE FOR DIGITAL COLLECTIBLES

CROSS-REFERENCE TO RELATED APPLICATIONS

This application is related to and claims priority from the following US patent applications. This application claims priority to and the benefit of U.S. Provisional Patent Application No. 63/221,688, filed Jul. 14, 2021, which is incorporated herein by reference in its entirety.

BACKGROUND OF THE INVENTION

1. Field of the Invention

The present invention relates to certifying fan status, and more specifically to a blockchain-based platform for validating fan status and facilitating engagement and transactions between fans.

2. Description of the Prior Art

It is generally known in the prior art to provide personalized certificates and/or collectibles. It is also generally known in the prior art to provide social networks for engagement between people of shared interest.

Prior art patent documents include the following:

U.S. Patent Publication No. 2007/0278784 for personalized fan certificate by inventor Aragon, filed May 17, 2007 and published Dec. 6, 2007, is directed to a personalized fan certificate having a displayable sports/entertainment/event logo, a team/entertainer/event name, as well as a personalized fan name or affiliation printed on the certificate. The personalized fan certificate allows a fan to have an entertainer/team/event/season/ticket holder status/charity sponsored certification of loyalty, and includes on the certificate the selected logo, decal, or indica of the object of the loyalty, along with text that represents a particular sport, athlete, or entertainer. Each certificate may contain a gold seal with embossed text, and may be printed on certificate paper which in any size. The certificate may in addition contain logos or insignia of larger organizations to which the object of fan loyalty in turn belongs, such as logos of sports leagues, studios, event sponsors or the like.

U.S. Patent Publication No. 2006/0155659 for method and system for promoting fan identification with a sports team by inventor DiCesare, filed Nov. 23, 2004 and published Jul. 13, 2006 is directed to a system and method for promoting fan identification with a sports team. The method including the steps of identifying a group of fans of a sports team, selecting a unique identifier corresponding to each of the fans of the group and offering to each fan of the group a personalized article related to the sports team or an event associated therewith. Each of the personalized articles bearing indicia corresponding to the unique identifier associated with the offeree fan. The method further includes providing the personalized articles to each fan of the group accepting the offer. A computer system for carrying out the method is also provided.

U.S. Patent Publication No. 2021/0192620 for machine learning-based digital exchange platform by inventor Golomb, filed Dec. 18, 2020 and published Jun. 24, 2021 is directed to obtaining a plurality of different digital asset types, at least a first digital asset type of the plurality of different digital asset types comprising a predefined digital asset type, and at least a second digital asset type of the plurality of different digital asset types comprising a dynamically defined digital asset type. Converting the first digital asset type to a first digital asset object based on the predefined digital asset type and an object model. Converting the second digital asset type to a second digital asset object based on the dynamically defined digital asset type and the object model. Identifying, based on machine learning, a first candidate set of users of a plurality of users to potentially be issued first digital asset units associated with a first brand, each the first digital asset units comprising a corresponding instance of the first digital asset object. Identifying, based on machine learning, a second candidate set of users of the plurality of users to potentially be issued second digital asset units associated with a second brand, each the second digital asset units comprising a corresponding instance of the second digital asset object. Issuing at least one first digital asset unit associated with the first brand to at least a first user of the first candidate set of users. Issuing at least one second digital asset unit associated with the first brand to at least a second user of the second candidate set of users. Recording the issuing of the first digital asset units and the issuing of the second digital asset units in a distributed ledger. Updating the distributed ledger based on one or more events.

U.S. Patent Publication No. 2020/0342547 for systems and methods for facilitating engagement between entities and individuals by inventor Haith, filed Apr. 15, 2020 and published Oct. 29, 2020, is directed to a method for facilitating engagement between entities and individuals. Accordingly, the method may include receiving at least one digital content associated with at least one entity form at least one individual device associated with at least one individual, analyzing the at least one digital content associated with the at least one entity, determining at least one fanaticism value associated with the at least one digital content based on the analyzing, determining at least one reward corresponding to the at least one individual based on the at least one fanaticism value, generating at least one reward notification corresponding to the at least one reward based on the determining of the at least one reward, transmitting the at least one reward notification to at least one presentation device.

U.S. Pat. No. 8,651,370 for system for providing coded personalized souvenirs by inventors Mudrick, et al., filed May 10, 2013 and issued Feb. 18, 2014 is directed to techniques, systems, methods and apparatus for providing coded souvenirs linked to web-based personalized content related to individual consumer identifiers, locality identifiers and/or both as well as to methods and apparatus for providing and servicing a coded personalized souvenir program. Additional embodiments also include laser engraved coded souvenirs.

U.S. Pat. No. 10,516,658 for systems and methods for verifying attributes of users of online systems by inventor Rappaport, filed Dec. 17, 2018 and issued Dec. 24, 2019 is directed to methods and systems are provided which enable verifying attributes of an individual. An individual registered for participation in a virtual or online environment may provide evidence of the attributes from a verification source that exists outside the virtual or online environment. An administrator associated with the virtual or online environment verifies the attributes by receipt of the evidence. Alternatively, the attribute for the individual may be verified after receipt of one or more signals indicating individuals registered for participation in the virtual or online environment have corroborated the attributes. A verification indication for an attribute may be shared with other individuals in the virtual or online environment.

U.S. Patent Publication No. 2008/0262926 for business system and method to increase revenues in baseball and other sports by inventors Spriegel, et al., filed Apr. 21, 2008 and published Oct. 23, 2008 is directed to a business method of increasing fan attendance and sporting event revenues, the method comprising capturing in digital or analogue form a fan notable act, awarding points for the fan notable acts based upon specified factors, acknowledging the fan notable act with team or association recognition and/or prize(s), keeping statistics on the fan notable acts, and displaying and/or acknowledging the fan notable acts and/or statistics.

U.S. Patent Publication No. 2017/0069024 for system and method for trading digital assets between mobile devices by inventor Dupoteau, filed Sep. 12, 2016 and published Mar. 9, 2017 is directed to a mobile device and method for trading a digital asset with a buyer device. The method provides for publishing a publicly available list of digital assets from the selling mobile device that can be accessed by potential buyer mobile devices over a network. The seller mobile device evaluates a certificate associated with the digital asset to determine what trading rights are available to the seller device and what payment obligations to interested parties are associated with the digital asset. The payment obligations allow for revenue sharing between the seller device and the interested party as specified in the certificate. The seller mobile device verifies that the payment obligations are satisfied based on the terms of the trade for the digital asset and then transmits the digital asset to the buyer device.

U.S. Patent Publication No. 2013/0117156 for fractional ownership using digital assets by inventors Azmi, et al., filed Nov. 8, 2012 and published May 9, 2013 is directed to a platform and method provided for facilitating the trading of fractional ownerships of a digital representation of an asset. In one embodiment, the method includes: identifying an original physical asset for creating a corresponding digital asset; making a digital representation of the original physical asset; authenticating the digital representation; embedding or associating the digital representation with a unique identification code; storing the digital representations on a first non-transitory computer-readable storage medium; and placing the digital representation in a market for trading.

U.S. Patent Publication No. 2013/0262332 for entity-focused social media method and system by inventors Moon, et al., filed Mar. 15, 2013 and published Oct. 3, 2013, is directed to a social media that enables the user to create a personal space affiliated with an interest, in which the user may share individual data. The user may interact with other users who share the interest, in a virtual interaction area. The user may be allowed to permit escorted or unescorted friends limited access to the user's personal space and the interaction spaces to which they belong. The user may also interact with other users who share a related interest, but prefer an alternate competitor entity in the field of interest. Alternate competitor interaction may provide users from each competitor entity limited special insight into the particular competitor entity, to enrich the interaction experience of users from both entities. The user may establish multiple personal spaces, and link their individual interests through one personal space to another, so as to share insight into those other interests with the other users.

U.S. Patent Publication No. 2020/0193464 for blockchain-based platform for monetizing social media following by inventors Koenig, et al., filed Dec. 14, 2018 and published Jun. 18, 2020, is directed to a blockchain-based platform and methods for monetizing a social media following. An example method may commence with receiving content associated with an object of a social media following. The content may be received from at least one content source. The method may further include aggregating the content received from the at least one content source. The method may continue with gamifying the aggregated content to facilitate interactions of at least one fan of the object of the social media following with the aggregated content. The method may further include awarding at least one virtual asset to the at least one fan based on the interactions with the aggregated content. The method may continue with securely storing transactions associated with the at least one virtual asset to a blockchain and facilitating exchange of the at least one virtual asset for a currency.

SUMMARY OF THE INVENTION

The present invention relates to certification of fan status and creation of a platform for fan engagement and fan transactions.

It is an object of this invention to provide a platform operable to validate fan status of a user account by aggregating data from a plurality of sources. It is also an object of this invention to provide a marketplace for transactions of digital collectibles related to fan interest.

In one embodiment, the present invention provides a system for facilitating fan engagement including at least one server computer including a processor, a memory, and at least one database and at least one mobile device, wherein the at least one mobile device includes an application, wherein the at least one database includes device data, and wherein the device data includes location data determined via a geolocation component of the device, wherein a user account associated with the at least one mobile device includes user data, wherein the user data includes a fan status of a user, wherein at least one digital certificate is associated with the user account in the at least one database, wherein the at least one server computer is operable to receive a command from the application on the at least one mobile device to create at least one non-fungible token (NFT) from the at least one digital certificate, wherein the server computer is operable to instruct a third-party device to create the at least one NFT, and wherein a digital wallet on the at least one mobile device is operable to store the at least one NFT once the at least one NFT is created.

In another embodiment, the present invention provides a system for facilitating fan engagement comprising at least one server computer including a processor, a memory, and at least one database, and at least one mobile device, wherein the at least one mobile device includes an application and at least one sensor wherein the at least one database includes device and user data, and wherein the device and user data includes location data, wherein the application includes a social network platform providing a social network for the user account, wherein a profile associated with a second user account is operable to be accessed through the social network platform of the application upon the at least one mobile device scanning a unique code associated with the second user account, wherein scanning the unique code associated with the second user account causes the second user account to be added to the social network for the user account, wherein the user account associated with the at least one mobile device includes user data, wherein the user data includes a fan status of a user, and wherein the at least one server computer is operable to receive an input from the at least one mobile device, and wherein the input from the at least one mobile device includes a request to mint at least one non-fungible token (NFT).

In yet another embodiment, the present invention provides a system for facilitating fan engagement including at least one server computer including a processor, a memory, and at least one database, and at least one mobile device, wherein the at least one mobile device includes an application, wherein the at least one database includes device data and user data, wherein the user account associated with the at least one mobile device includes the user data, wherein the user data includes a fan status of a user, and wherein the user data further includes a unique fan identification (ID) and a unique code, wherein the unique code links to a profile associated with the user account when scanned or read by a second device, wherein a non-fungible token (NFT) is operable to be minted based on an image selected on the at least one mobile device, and wherein the NFT is operable to be sold through a marketplace of the application.

These and other aspects of the present invention will become apparent to those skilled in the art after a reading of the following description of the preferred embodiment when considered with the drawings, as they support the claimed invention.

DETAILED DESCRIPTION

Figure 1:
FIG. 1 illustrates a home page of a mobile application according to one embodiment of the present invention

The present invention is generally directed to certifying fan status and increasing fan engagement.

In one embodiment, the present invention provides a system for facilitating fan engagement including at least one server computer including a processor, a memory, and at least one database and at least one mobile device, wherein the at least one mobile device includes an application, wherein the at least one database includes device data, and wherein the device data includes location data determined via a geolocation component of the device, wherein a user account associated with the at least one mobile device includes user data, wherein the user data includes a fan status of a user, wherein at least one digital certificate is associated with the user account in the at least one database, wherein the at least one server computer is operable to receive a command from the application on the at least one mobile device to create at least one non-fungible token (NFT) from the at least one digital certificate, wherein the server computer is operable to instruct a third-party device to create the at least one NFT, and wherein a digital wallet on the at least one mobile device is operable to store the at least one NFT once the at least one NFT is created.

In another embodiment, the present invention provides a system for facilitating fan engagement comprising at least one server computer including a processor, a memory, and at least one database, and at least one mobile device, wherein the at least one mobile device includes an application and at least one sensor wherein the at least one database includes device and user data, and wherein the device and user data includes location data, wherein the application includes a social network platform providing a social network for the user account, wherein a profile associated with a second user account is operable to be accessed through the social network platform of the application upon the at least one mobile device scanning a unique code associated with the second user account, wherein scanning the unique code associated with the second user account causes the second user account to be added to the social network for the user account, wherein the user account associated with the at least one mobile device includes user data, wherein the user data includes a fan status of a user, and wherein the at least one server computer is operable to receive an input from the at least one mobile device, and wherein the input from the at least one mobile device includes a request to mint at least one non-fungible token (NFT).

In yet another embodiment, the present invention provides a system for facilitating fan engagement including at least one server computer including a processor, a memory, and at least one database, and at least one mobile device, wherein the at least one mobile device includes an application, wherein the at least one database includes device data and user data, wherein the user account associated with the at least one mobile device includes the user data, wherein the user data includes a fan status of a user, and wherein the user data further includes a unique fan identification (ID) and a unique code, wherein the unique code links to a profile associated with the user account when scanned or read by a second device, wherein a non-fungible token (NFT) is operable to be minted based on an image selected on the at least one mobile device, and wherein the NFT is operable to be sold through a marketplace of the application.

None of the prior art discloses a platform for fans wherein the platform is operable to validate fan status using a plurality of data metrics and wherein the platform is also operable to create a marketplace for transactions of collectibles between fan accounts.

Referring now to the drawings in general, the illustrations are for the purpose of describing one or more preferred embodiments of the invention and are not intended to limit the invention thereto.

Fan Status

A fan in one embodiment of the present invention is a supporter of a group, a person, an organization, a location, an agency, a company, and/or a cause. Fans are often self-designated in that there is no set requirement or governing body that determines whether someone is a fan. However, fans are often an essential component in allowing a group (e.g., a sports team) to be successful. Fans attend events, cheer for teams, purchase merchandise, watch games, and keep track of updates to the teams. In addition, fans function as informal promoters of the team by increasing awareness and excitement for the team through events, social media, and other communications. Fans provide financial, emotional, and mental support to groups and their respective industries as well as the organizations that own and manage the groups. Without serious fans, the sports industry would not generate nearly as much revenue internally (within the industry) or externally (for related industries) via ticketing, broadcasting, merchandising, and advertising. One of the top threats to the revenue for professional sports leagues includes the decreasing loyalty of fans. However, this threat is also an opportunity to increase revenue by improving fan engagement.

Despite the invaluable direct and indirect contributions of fans to the groups they support, there is no standardized way to confirm the status of a fan and/or to grant benefits to fans based on their levels of interest, engagement, and contribution. In addition, groups with fans need a way to engage with, increase, and retain fan support. For example, while a lot of statistics and data exist for big games such as the Super Bowl, there is currently not a technology which provides for recognition of the fans who attended the game. Similarly, there is not a record of the fans for particular sports teams, such as the fans of the New York Yankees over the years. A technology which provides for recognizing fans of a sports team over the years provides for increased fan engagement through increased recognition of the fans and provides the opportunity for fans of a team to interact in ways previously not possible before the advent of computer technology and the internet. Additionally, blockchain technology and non-fungible tokens (NFTs) provide for storing immutable records relating to fans, such as attendance at events and provide unique collectibles which are operable to be authenticated and traded with other fans. The present invention is directed to systems and methods for creating, validating, updating, and certifying fan status. The present invention is also in one embodiment directed to creating a platform for fan communications, engagement, and transactions. Fan status in the present invention is a metric of social interaction, engagement, time spent, money spent, events attended, and/or other ways of measuring support and interest. Both quantitative and qualitative measures of fan status are compatible with the present invention. Preferably, the fan status is used for fans of sports teams. Alternatively, fan status refers to fans of musicians, performers, actors, celebrities, entertainers, artists, writers, influencers, and/or content creators.

In one embodiment, the present invention includes at least one platform, wherein the at least one platform includes a data collection engine, a plurality of user accounts, and/or a marketplace for digital and/or physical goods. The digital goods include but are not limited to tokens, certificates, merchandise, and/or collectibles. In one embodiment the digital goods further includes a stake and/or an ownership of an object or a group. The physical goods includes but are not limited to certificates, souvenirs, collectibles, equipment, and/or memorabilia. The present invention also includes in one embodiment a digital gallery for displaying the digital goods. In one embodiment, the digital goods are linked to physical goods. In one embodiment, the tokens represent equity stake and/or ownership. The at least one platform is accessible by a user device via a user interface and is operable to collect data related to the user device and the user account. The user device includes but is not limited to a mobile device, a smartphone, a tablet, a computer, a wearable (e.g., a smart watch), a smart appliance, a game console, a kiosk, and/or a smart home assistant. The user interface includes but is not limited to a mobile application, a web application, a website, a game, and/or a voice-activated system. The data collection engine is operable to collect data from the user account and/or the user device, and the platform includes systems and methods for quantifying and validating fan status using the data.

The platform in one embodiment further includes a social media platform for user accounts to observe and communicate with each other. In one embodiment, the platform is operable to be accessed by a group that users are fans of, e.g., a sports team such that the platform is operable to present fan data and user account data to the group.

Data Collection and Analysis

The data collection engine of the present invention is operable to collect user data in order to assess and/or confirm the fan status of a user account. The user data includes identification information about a user, including but not limited to a name, a date of birth, a residence, and/or contact information (e.g., an email address, a phone number). The user data further includes fan data about the user's interest as a fan of a group. In one embodiment, the fan data pertains to more than one group. The fan data includes but is not limited to the group (e.g., a sports team), a level of interest, a timeline of interest (e.g., when the user became a fan, how their interest has changed over time), reasons for interest, interest in specific people in the group, interest in specific aspects of the group, and/or knowledge about the group. In one embodiment, the level of interest in a group is determined using a quantitative metric. Alternatively, the level of interest is qualitative and includes a description by the user. Preferably, this data is collected by the mobile application upon registration of a user account with the mobile application.

FIG. 1 illustrates a home page of the mobile application according to one embodiment of the present invention. The home page includes a log in function which prompts for entry of a username and password, a scan a certificate function which links to a certificate scanning page of the mobile application, a scan unique ID function which links to a page operable to provide functionality to scan a unique ID, and a registration function which prompts for information for creating an account.

Figure 2:
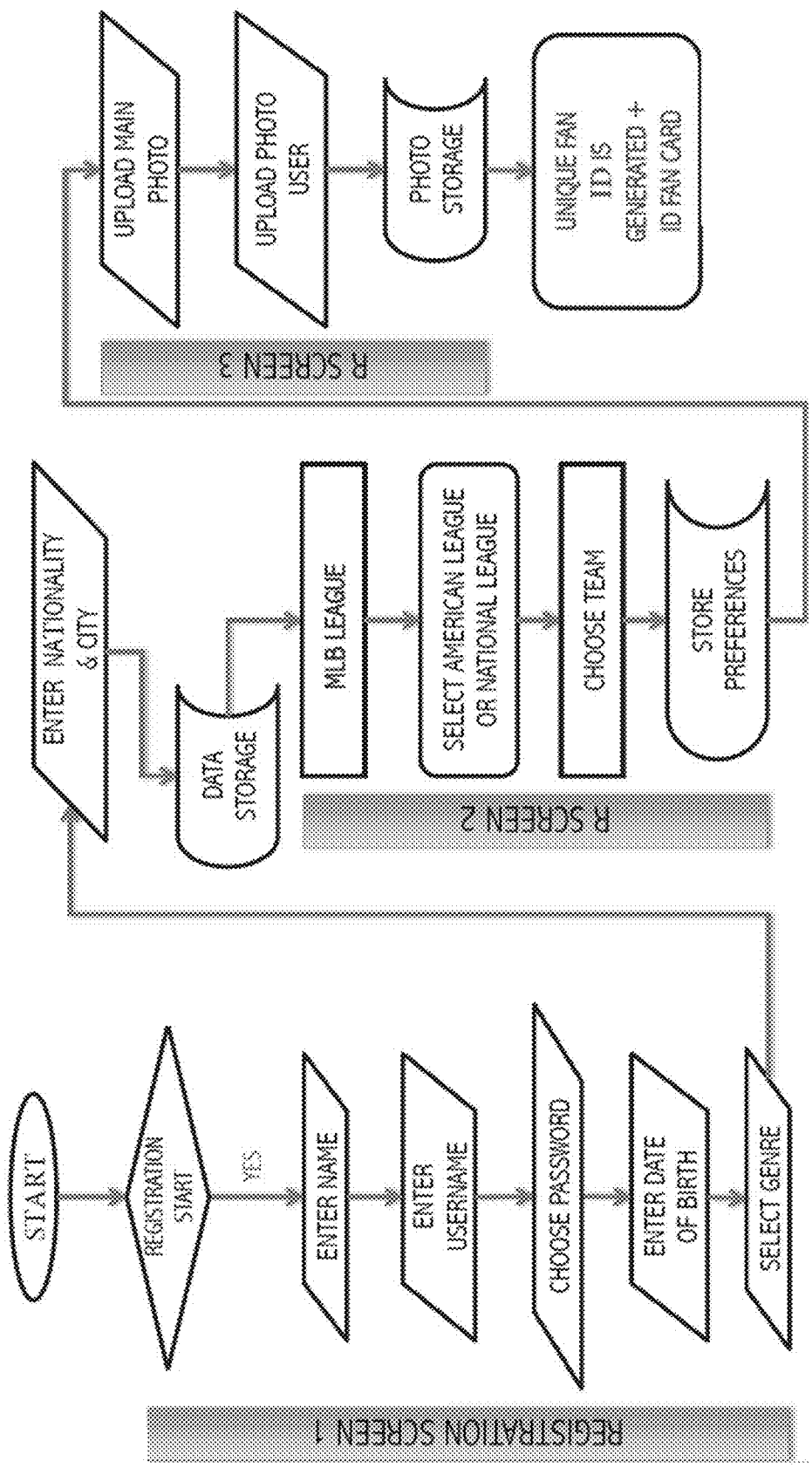
FIG. 2 illustrates a flow chart of a registration process for creating a user account and associated unique fan identification (ID).

Upon activating the registration function of the application, the GUI displays a page which provides for registration of a user account. FIG. 2 illustrates a registration process for creating a user account and associated unique fan identification (ID). A graphical user interface (GUI) prompts for entry of a name of the person associated with the account, a unique username, a password, a date of birth, a genre of sports, music, or other entertainment of interest, and a nationality and city. In FIG. 2, for example, baseball is selected as the genre of interest, and the GUI includes a prompt for the baseball league from which a sports team is selected. Upon receiving a selection of the MAJOR LEAGUE BASEBALL (MLB), a selection is made between the AMERICAN LEAGUE and the NATIONAL LEAGUE. Once the AMERICAN LEAGUE or the NATIONAL LEAGUE is selected, a team is selected from the selected league. The preferences are saved, and a user photo for the unique fan card is operable to be selected locally from the computing device such as a mobile phone, from a uniform resource locator (URL), or from a social media website such as FACEBOOK or TWITTER. Additionally, a second image is operable to be selected for the fan card, which is operable to be another photo of a fan. Upon receiving this information, a server or cloud platform connected to the device displaying the GUI is operable to be generated. Advantageously, the unique fan identification is generated along with a unique fan identification card which represents the fan.

Figure 3A:
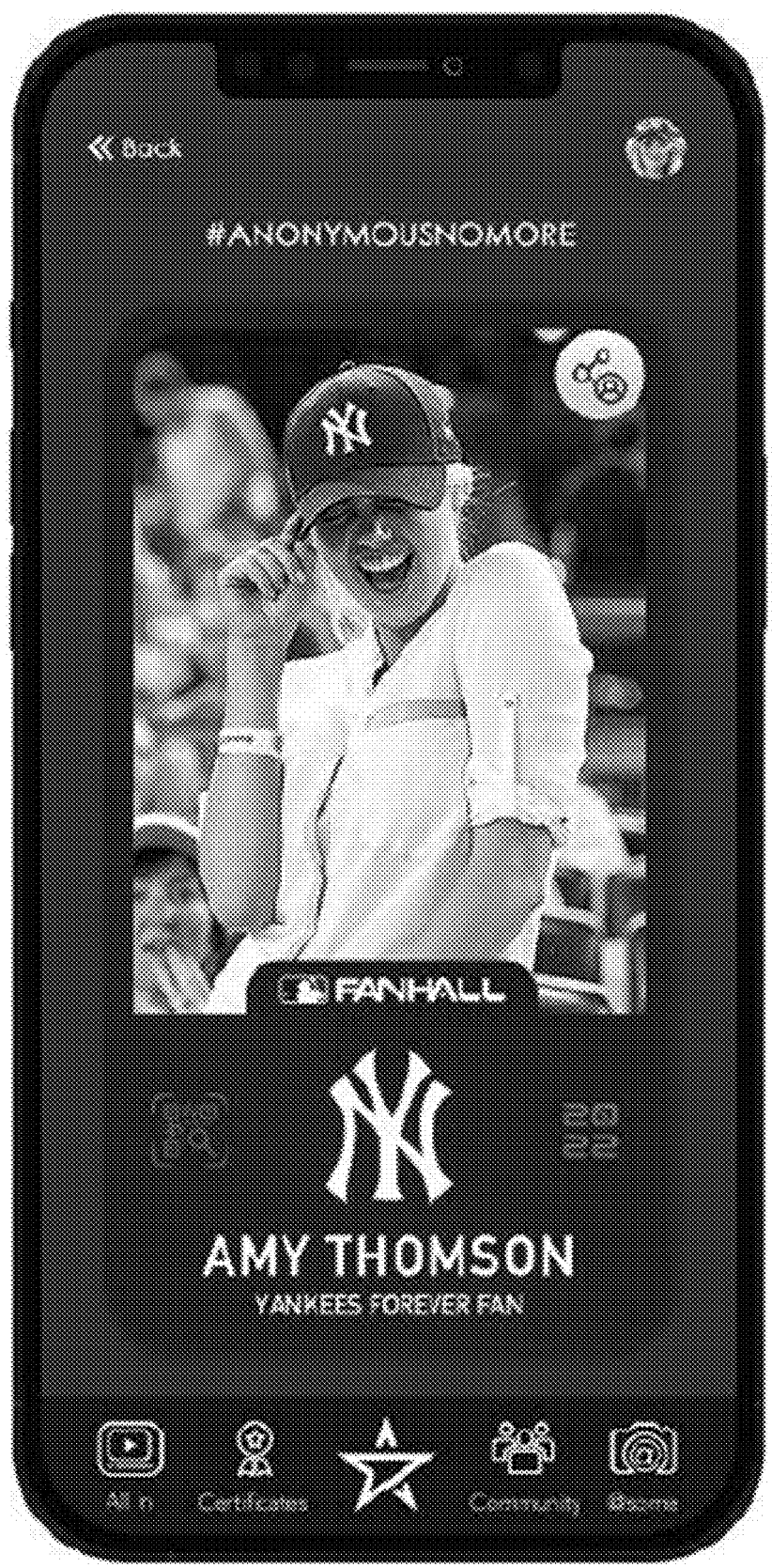
FIG. 3A illustrates a first side of a unique fan card displayed in a mobile application according to one embodiment of the present invention.
Figure 3B:
FIG. 3B illustrates a second side of a unique fan card displayed in a mobile application according to one embodiment of the present invention.

FIG. 3A illustrates a first side of a unique fan card displayed in a mobile application according to one embodiment of the present invention. The first side of the unique fan card includes the first image, the team the fan selected, and the year the fan created the unique fan card. FIG. 3B illustrates a second side of a unique fan card displayed in a mobile application according to one embodiment of the present invention. The second side of the unique fan card includes the second image, the country of nationality and city of residence, and in one embodiment, a physical representation of the country or city such as a flag. The second side of the card includes a link to certificates associated with the fan, a photobook link linking to the photos associated with the fan account, a unique code which is operable to be scanned by another device including another fan account to link fan accounts, and a unique fan identity code. In one embodiment, the unique fan identity code includes twenty-three characters, with the first three characters representing the league (ex: MLB), the second three characters representing the country (ex: USA), the third three characters representing the city (ex: NYC), the next six characters representing the date of birth (ex: 093097), a key letter string (ex: AA), and the date of registration (ex: 040822).

Fan status is typically self-reported and self-determined in that there is no objective way to determine that someone is a fan without knowing them personally and/or having extensive knowledge of their life. The platform of the present invention is operable to enhance the user account with additional data that provides an objective and validated system for determining fan status. The data collection engine is operable to actively and/or passively collect fan data from the user account and/or the user device. The fan data in one embodiment includes but is not limited to ticket purchases, event attendance, viewership data, purchasing history, web analytics (e.g., browsing history), social media analytics, image data, audio data, and/or video data. The data collection engine is operable to collect web analytics when the user device is interacting with the platform as part of the fan data. Alternatively, the data collection engine is operable to collect web analytics when the user device is interacting with sites, content, and/or applications external to the platform. The data collection engine is also operable to present questions to the user account about fan status and/or history and use input from the user account in response to the questions as part of the fan data. The data collection engine is operable to integrate the fan data and the user data in order to create a comprehensive user profile wherein the user profile includes identifying information as well as information pertaining to fan status. For example, a user profile displays the name of a fan of a sports team as well as the number of games that the fan has attended. Because physical game attendance is only one indication of fan interest that has inherent barriers (e.g., location, cost, time, mobility), the data collection engine is operable to use other data such as how many games a fan watches live on television to further determine fan status. In a non-limiting example, a user account is operable to upload an image of a collection of merchandise related to a sports team. The platform of the present invention is operable to detect the products in the image and use that data to assess the fan's interest in the team. In yet another non-limiting example, the data collection engine is operable to determine how much time the user device spends accessing online forums related to the team of interest and use the data as an indicator of the fan's investment in the team. In one embodiment, the platform is further operable to integrate data from external accounts as part of the user data for the user account. The external accounts include but are not limited to social media accounts, ticket platform accounts, financial accounts, and/or membership accounts.

Figure 3C:
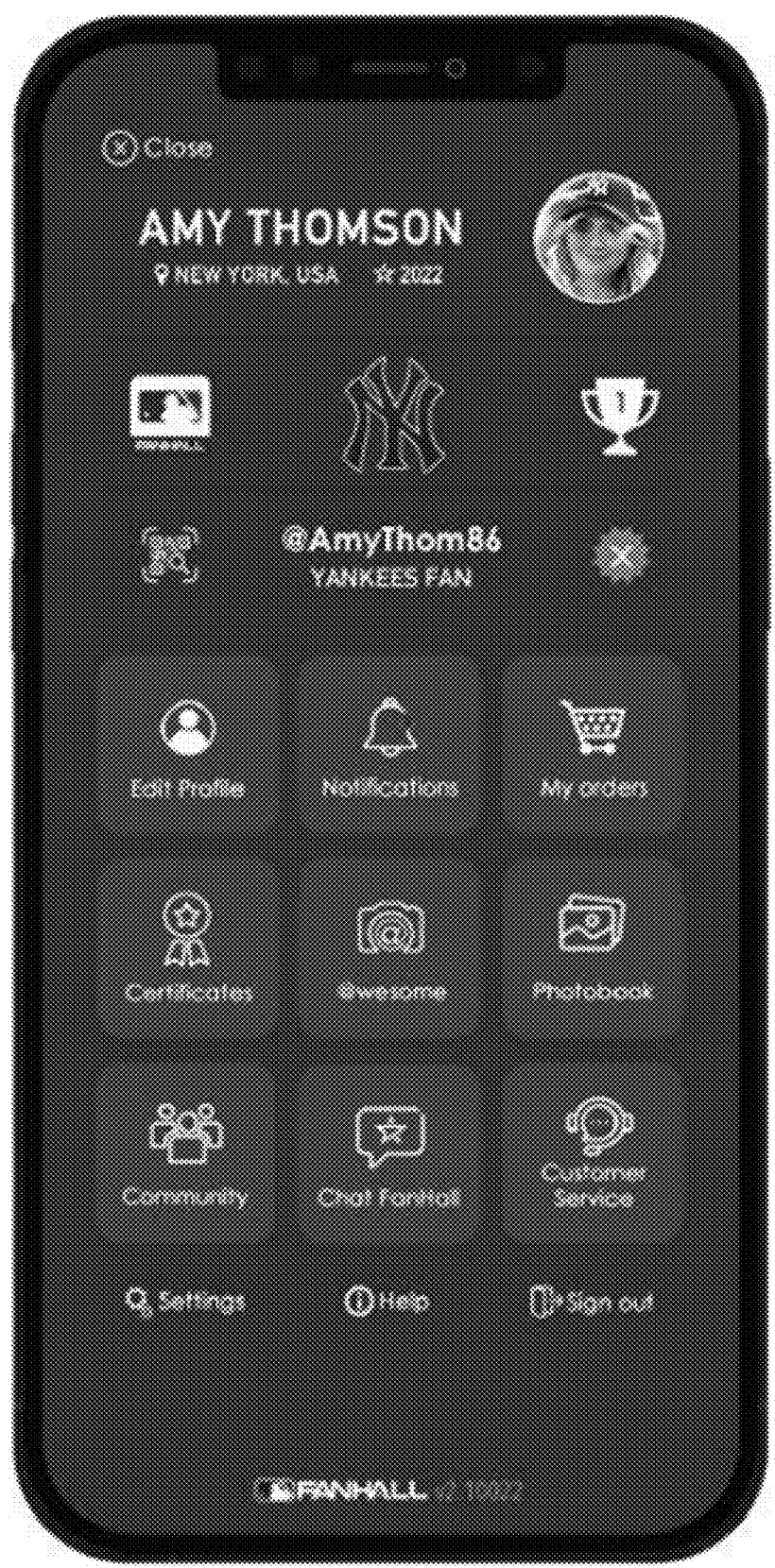
FIG. 3C illustrates a home page for a fan account according to one embodiment of the present invention.
Figure 3D:
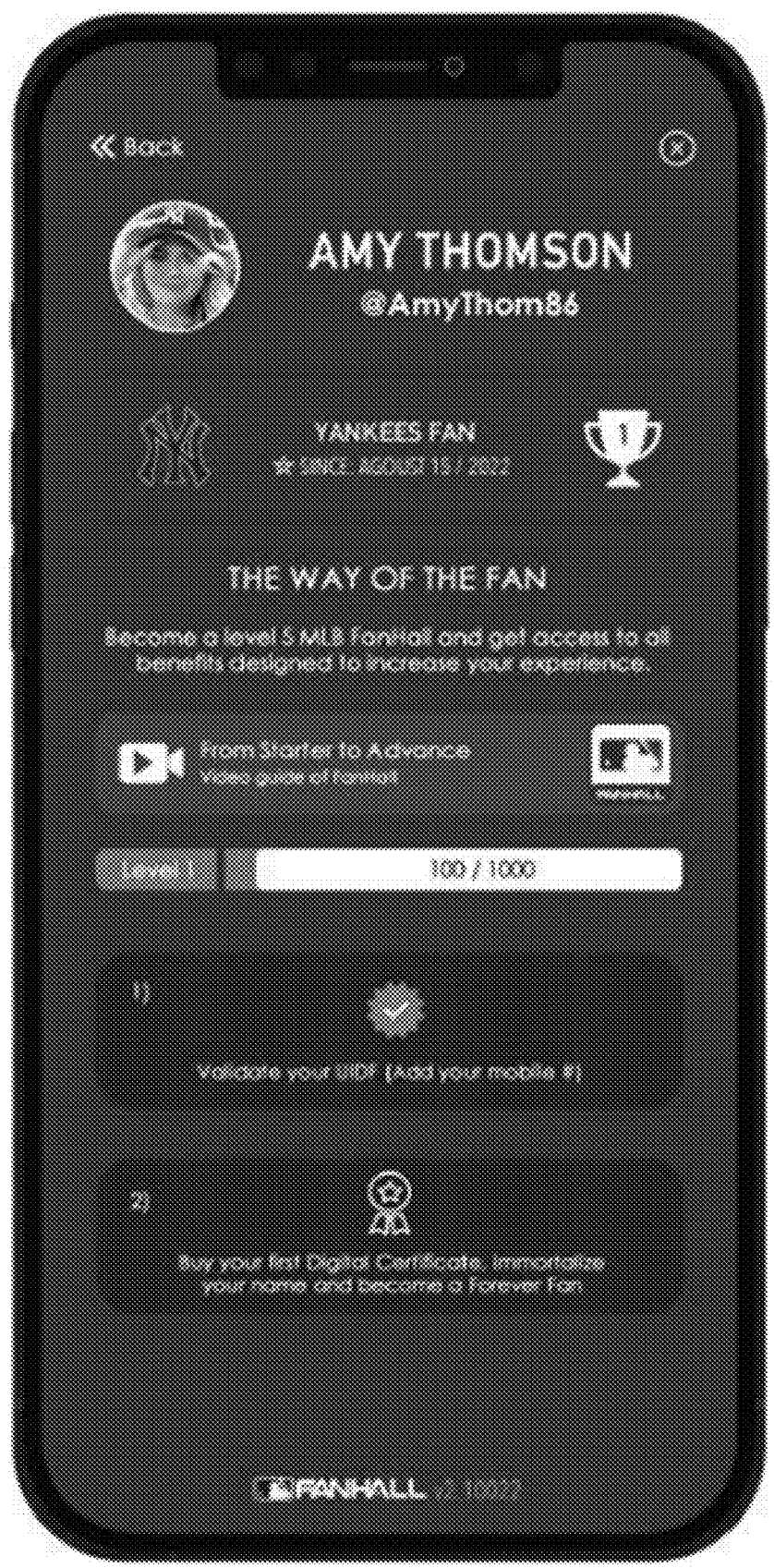
FIG. 3D illustrates the fan level page of a user account having a first fan level according to one embodiment of the present invention.
Figure 3E:
FIG. 3E illustrates the home page of a user account having a second fan level according to one embodiment of the present invention.

FIG. 3C illustrates a home page for a fan account according to one embodiment of the present invention. FIG. 3C includes several selectable tiles, with each tile providing a link to additional content or functionality. The Edit Profile tile provides for editing a profile of the user. The notifications tile provides for selecting a newsfeed of notifications relating to activity for the fan, activity of other fans, activity of teams, activity of leagues, etc. The My Orders tile relates to orders placed by the user account, including but not limited to, certificates and non-fungible tokens (NFTs) ordered by the user account. The Certificates tile provides a list of certificates purchased by the user. The @wesome tile provides access to a camera of a mobile device within the mobile application and allows for photos to be taken and stored within the application, with the option for the photos to be transformed into certificates. The Photobook tile provides a gallery of photos taken within the mobile application. The community tile provides a link to a community of other fans of the team and/or the league associated with the user, including fans who are connected to the user account and search functionality for searching for additional connections by location and by team. The Chat FanHall tile provides for chat functionality with other mobile application users. The Customer Service tile provides a link to a customer service chat to troubleshoot any issues. When selected, the trophy icon at the top right of the screen illustrated in FIG. 3C provides a link to information to the fan level page for the fan account. FIG. 3D illustrates the fan level page of a user account having a level one fan level, including a progress bar indicating the progress made towards a next fan level and recommended steps to advance to a next fan level. FIG. 3E illustrates a fan level page having a level five fan level. Advantageously, obtaining a higher fan level provides for more benefits and access to information through the mobile application compared to lower fan levels.

In one embodiment, the data collection engine is further operable to determine a location of the user device. In one embodiment, the data collection engine is operable to collect and analyze sensor data from the user device to determine the location. The sensor data includes but is not limited to accelerometer data, magnetometer data, gyroscope data, barometer data, ambient light data, proximity sensor data, temperature data, humidity data, WIFI signal data, radiofrequency signal data, depth sensor data, an image, a video, an audio recording, visual odometry data, and/or "virtual sensor" data taken from the combination of two or more of the above-mentioned types of sensor data. In another embodiment, the data collection engine is operable to access global positioning system (GPS) data on the user device in order to determine the location of the user device. In yet another embodiment, the data collection engine is operable to determine the location of the user device using the proximity of the user device to a cell tower, e.g., by using a cell identification (cell ID), wherein the cell ID is used to identify a base station in proximity to the user device. Alternatively, the data collection engine is operable to determine the location of the user device using an application programming interface (API), e.g., a Hyper Text Markup Language (HTML) API, wherein the data collection engine is operable to call a geolocation API to determine the location of the user device. The platform is then operable to use the location of the user device to determine fan activity. For example, the platform is operable to detect when the user device is at a stadium during a sporting event and log attendance data with the user account associated with the user device. In another example, the platform is operable to detect when the user device is at a watch party, or an event with many other fans, and log that attendance with the user account associated with the user device. The platform is operable to detect when a first user device associated with a first user account is in proximity to at least a second user device associated with at least a second user account. In one embodiment, the data collection engine is operable to combine location data with other user data and/or fan data, e.g., ticket purchases, to confirm the location of the user device and the intended purpose of the fan for being in that location. In one embodiment, the platform is operable to determine location of the user device and correlate the location data with event data in real time or near real time. Real-time or near real-time detection of location and correlation with fan data eliminates the possibility that a user will be able to falsify information about their event attendance.

In one embodiment, the platform is operable to divide fans into tiers based on fan status. The tiers indicate whether a user account is more of a fan or less of a fan. In one embodiment, the tiers are relative and are based on an overall fan population of the group and/or organization of interest. Alternatively, the tiers are based on measures of engagement, e.g., a number of events attended, time spent engaging with content, etc. The platform is operable to reassess and update fan status and determine if a fan has changed tiers. The platform is operable in one embodiment to tailor access and/or offerings based on fan status. For example, user accounts with higher fan status are operable to access certain information while user accounts with lower fan status are not able to access this information. In another embodiment, a first user account is operable to set access to permissions and/or offerings for other user accounts based on fan status. For example, a user account hosts an online watch party with a fan status threshold wherein only user accounts that meet the fan status threshold are operable to access the online watch party.

In one embodiment, the platform includes a social networking platform wherein user accounts interact with each other on the social networking platform. The fan status and at least a portion of the fan data of a user account is available on a public-facing profile, and the user accounts are operable to send real-time messages to each other. The data collection engine is operable to collect more fan data about a user account based on the user account's engagement with the social networking platform. In one embodiment, engagement with the social networking platform results in changes in fan status. In one embodiment, the social networking platform includes systems and methods for comparing and/or displaying fan status, e.g., a leaderboard. The social networking platform also includes a marketplace wherein user accounts are operable to display, appraise, buy, sell, gift, and/or exchange goods (e.g., digital collectibles) via the social networking platform.

Figure 4:
FIG. 4 illustrates a screenshot of the mobile application operable to scan a unique code associated with a unique fan certificate or receive a unique fan ID to access the profile associated with the fan according to one embodiment of the present invention.

FIG. 4 illustrates a screenshot of the mobile application operable to scan a unique code associated with a unique fan certificate or receive a unique fan ID to access the profile associated with the fan. In one embodiment, after accessing the profile associated with another fan, the present invention provides for an option to add the other fan to the fan's social network associated with the mobile application of the present invention. By providing this feature, the present invention provides for social networking among fans in person in real-time.

Figure 5:
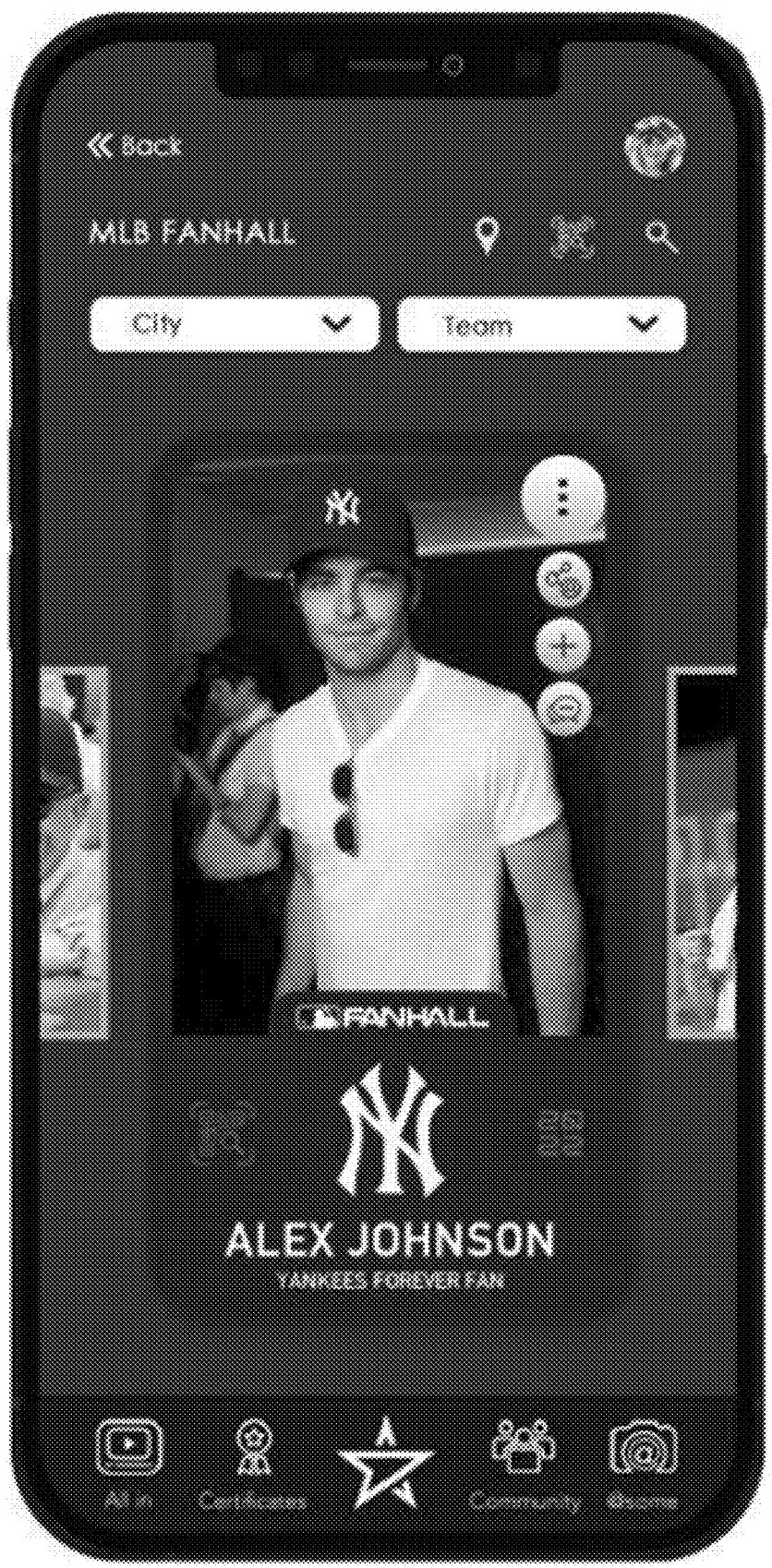
FIG. 5 illustrates a fan card according to one embodiment of the present invention.
Figure 6:
FIG. 6 illustrates a map view of a search for fans according to one embodiment of the present invention.

FIG. 5 illustrates a fan card of another fan accessed through scanning a unique code associated with a unique fan certificate or inputting a unique fan ID into the GUI of FIG. 6. Advantageously, the GUI of the mobile application provides for searching or filtering fans by city and/or by team. FIG. 6 illustrates a map view of a search for fans in New York City who are fans of the NEW YORK YANKEES. In one embodiment, the map view is generated based on the current location of the mobile device determined via any geolocation method described herein. The locations of the other fans on the map view are operable to be updated in real time or near real time as the mobile devices associated with the other fans move. In this way, it is possible to identify how many mobile application users are present at a certain location, such as at a game venue, a restaurant where a game is being broadcast, spring training, etc.

In one embodiment, the platform further includes a data analytics engine wherein the data analytics engine is operable to provide personalized and/or group data regarding fan status. The data analytics engine is operable to use data collected by the data collection engine to determine information about a user account and/or about a group of user accounts as pertains to fan engagement and interest, thus generating fan analytics. The fan analytics are useful for groups including a sports team, a celebrity, a manager, an owner, an investor, a partner, a contractor, and/or a coach who want to assess, increase, and retain fan interest. In one embodiment, the data analytics engine is operable to receive input and/or parameters regarding desired data types and/or metric types when generating the fan analytics. In one embodiment, the data analytics engine further includes data visualizations of the fan analytics. The fan analytics includes but is not limited to trends, views, shares, sentiments, social media engagement, media consumption, ticket sales, merchandise sales, and/or other sales.

Certificates

In one embodiment, the present invention is operable to provide a personalized certification of fan status to a user account. A certificate is an accessible and standardized way to verify fan status that is operable to be visually presented. In one embodiment, the certificate is a poster, a sign, a tag, a label, a certificate, a sticker, a plaque, and/or a paper good. Alternatively, the certificate is an object, e.g., a trophy, a statue, a piece of sports equipment and/or other relevant equipment, a toy, a keychain, and/or an article of clothing. In one embodiment, a user account has a plurality of certificates. The certificate is easily recognizable as indicative of fan status. An advantage of the present invention is that the certificate is also customizable based on the user data and that if the certificate is a physical good, it is linked to a corresponding digital certificate. In one embodiment, customization of the certificate is performed using at least one of printing, engraving, extruding, etching, carving, embossing, and/or painting of a customized indicator onto the certificate. The indicator includes but is not limited to a name, an alphanumeric identifier, a location, a birthdate, an anniversary date, fan data, any other identifying information. A user account is operable to choose the indicator. The user account is further operable to customize the certificate as a whole, e.g., by changing the size, color, shape, layout, format, font, model, and/or style of the certificate. The customized indicator provides easy identification of the owner of the certificate. Advantageously, the customizable aspect of the certificate means that the certificate is unique to the fan. In one embodiment, the certificate includes anti-counterfeit measures, e.g., a watermark, latent indicia, a serial number, a security ribbon, a security thread, raised printing, and/or microprinting. In one embodiment, the user account is also operable to request a display holder for the certificate, e.g., a frame, a case. The platform is operable to customize the display holder. For example, the display holder includes a logo, such as a laser engraved logo. The display holder is operable to be customized by at least any of the methods for customization of the certificate described herein.

In one embodiment, the certificate further includes a tag, e.g., a quick response (QR) code, a near field communications (NFC) code, a bar code, a serial identification number, a magnetic strip, a SnapTag, a radiofrequency identification (RFID) tag, an image, a video, and/or an audio sample. In one embodiment, the tag is not visible under visible light. Advantageously, the tag of the present invention is operable to be digitally processed and correlated with a digital record rather than only physically assessed. The tag is operable to be scanned by a camera of a user device, wherein scanning the tag routes the user device to view the fan status and/or the user account associated with the certificate. Alternatively, the platform presents the digital certificate corresponding to the physical certificate on the user device when the user device scans the tag. The tag links the digital certificate to records related to the digital certificate and the user account in possession of the digital certificate. A user account is operable to choose the tag and/or the data associated with the tag. In one embodiment, the certificate is a digital certificate in the form of at least one of the certificate forms described herein. In one embodiment, the user account is operable to continuously modify the form of the digital certificate. In another embodiment, a certificate number is operable to be entered in the mobile application. The mobile application is operable to communicate with at least one server to determine whether any of the certificates described herein is valid before adding the certificate to the user account.

Figure 7:
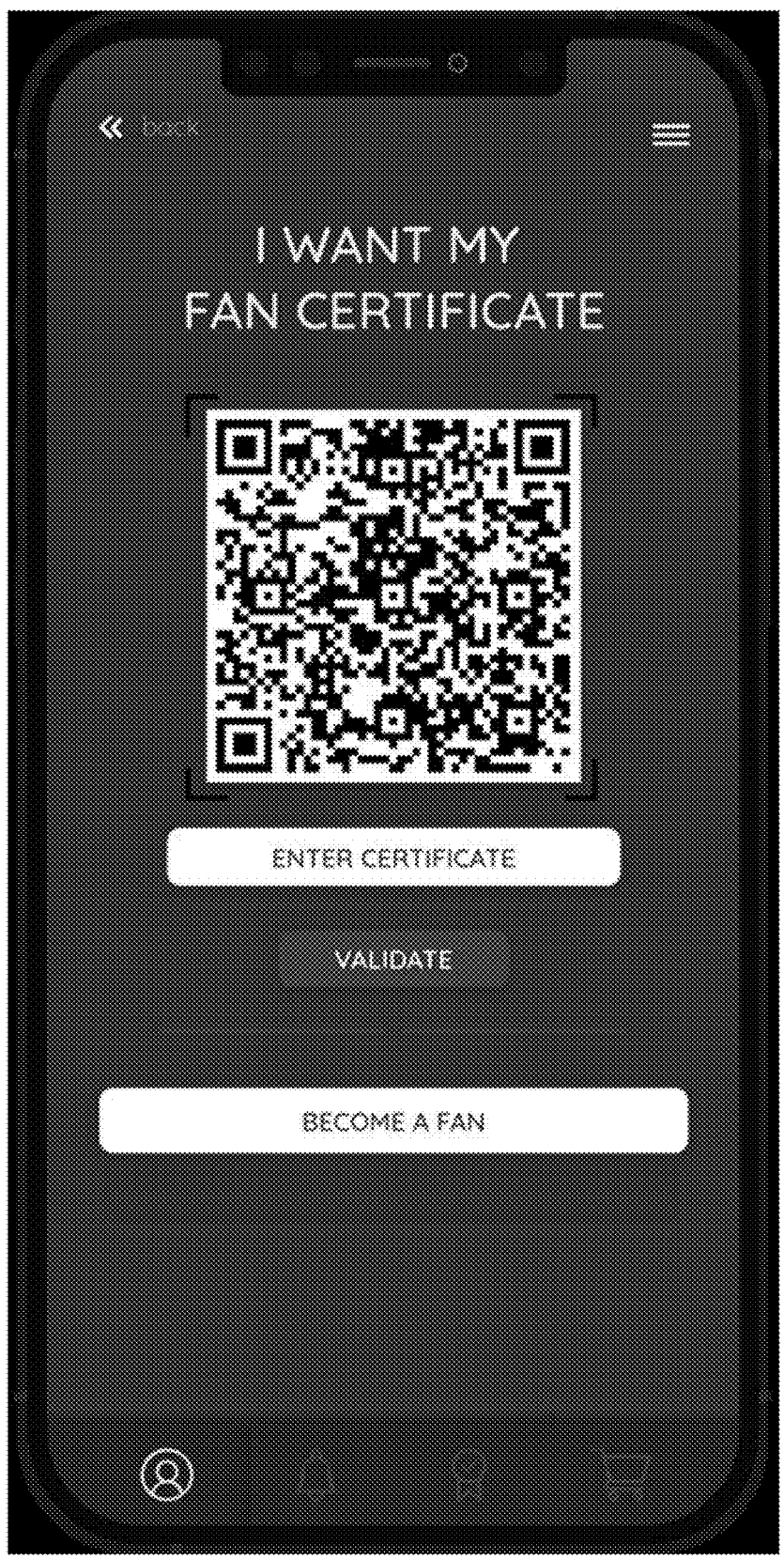
FIG. 7 illustrates a certificate retrieval and validation page according to one embodiment of the present invention.
Figure 8:
FIG. 8 illustrates a certificate retrieval and validation page according to another embodiment of the present invention.

FIG. 7 illustrates an embodiment wherein the user device scans a QR code located on the physical certificate and is thus operable to validate the physical certificate and view a digital certificate. FIG. 8 illustrates an alternative GUI of a mobile application where a QR code of a certificate is operable to be scanned and connected with the user account.

In one embodiment, the certificate is provided to the user when the user account has reached a fan status tier. Alternatively, the certificate is available to the user in exchange for a good and/or a monetary amount. In yet another alternative embodiment, the certificate is available to the user at any time. In one embodiment, the certificate is granted to the user based on attendance, or if the user device is at a specific location at a point in time. In one embodiment, the location of the user device is determined via GPS, signal data, and/or geolocation by the platform. As an alternative non-limiting example, a user device must scan a code at a physical location within a given time frame to prove that the user was at an event, and the certificate is given to the user account associated with the user device when the code is scanned. The certificate represents and/or references fan status of a given group and/or individual, e.g., a player or a celebrity. Alternatively, the platform is operable to create a certificate wherein the certificate represents and/or references an event or a moment in time. In yet another embodiment, the certificate represents at least one area of interest including but not limited to a group, an individual, a moment in time, an event, a location, an ownership, and/or a membership. For example, the certificate certifies attendance at a championship match. As another non-limiting example, the certificate certifies attendance at a concert. The user account is operable to personalize the certificate for any area of interest.

Figure 9:
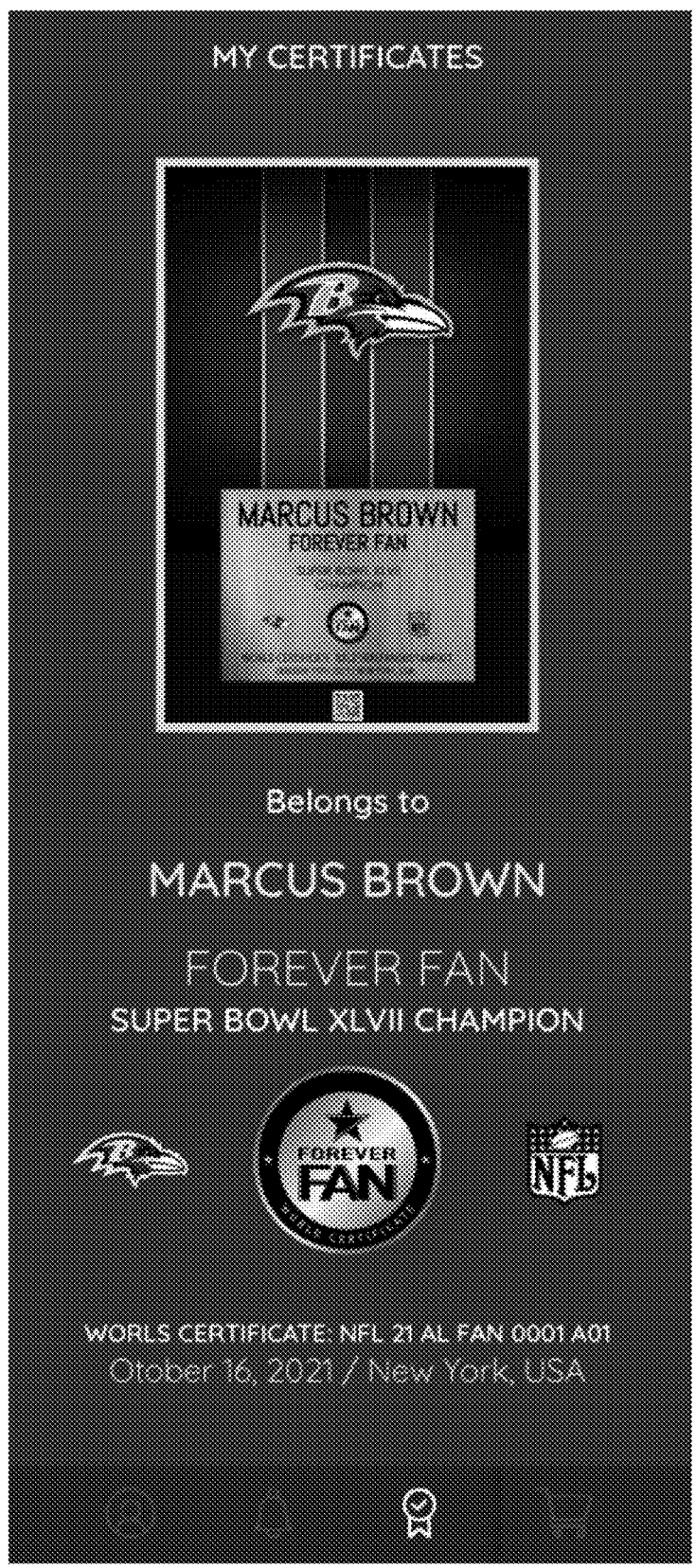
FIG. 9 illustrates a certificate according to one embodiment of the present invention.
Figure 10:
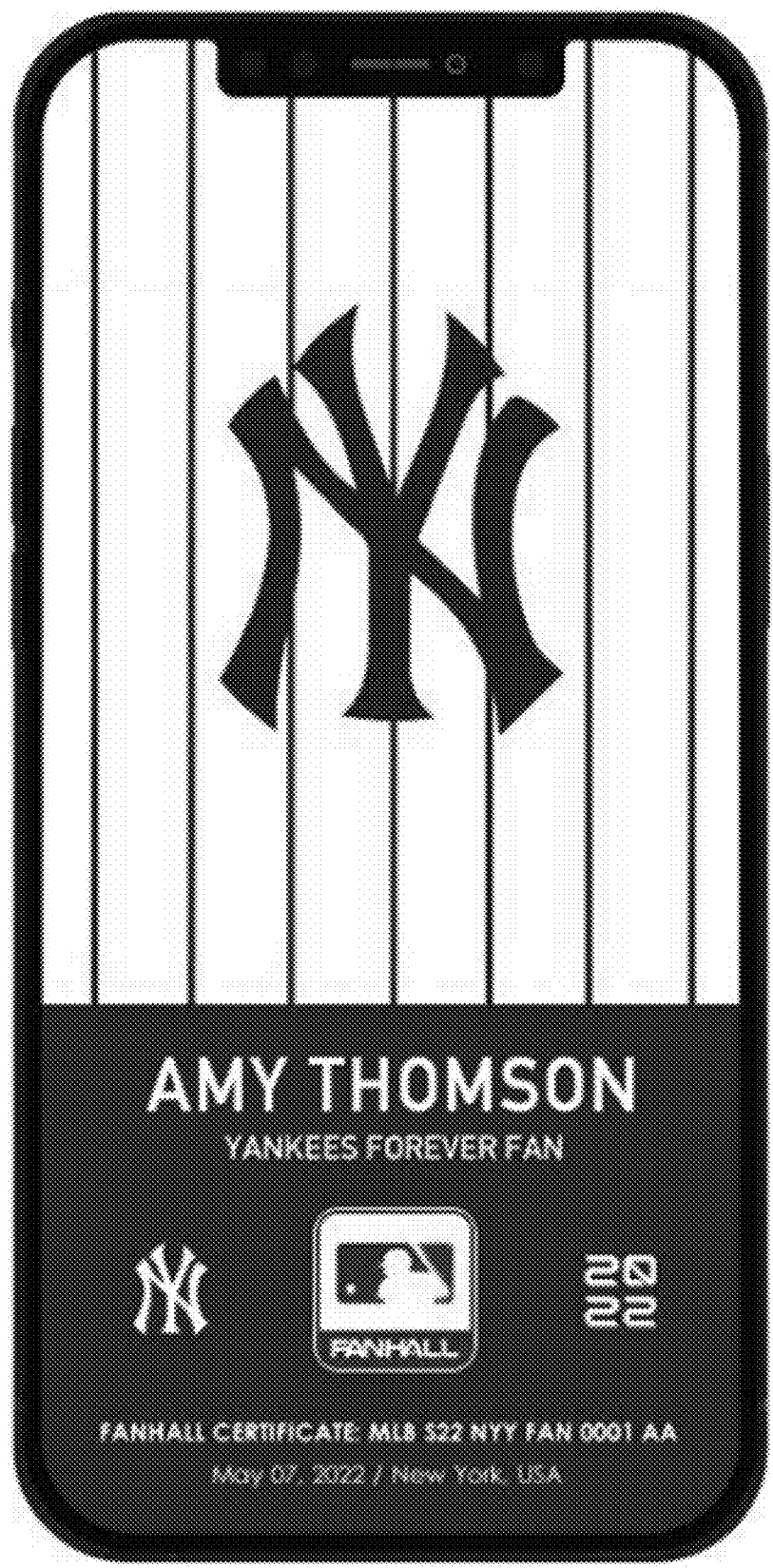
FIG. 10 illustrates an alternative embodiment of a fan certificate according to one embodiment of the present invention.

In a non-limiting example, the user account is operable to request a certificate via the user interface, e.g., a mobile app. The platform is operable to verify the user account and an identity of the user via a username, a password, contact information, location data, biometric data, and/or multifactor authentication. The platform is then operable to display possible certificates available to the user account based on user data, fan data, fan status, and/or location of the user device as determined by the platform. The certificate is in one embodiment related to a sports team, a sports league, and/or a player. The user account is operable to customize the certificate including but not limited to changing the visual appearance of the certificate and/or identifying information on the certificate. FIG. 9 illustrates one embodiment of a certificate of the present invention as presented on a mobile app. FIG. 10 illustrates an alternative embodiment of a fan certificate according to one embodiment of the present invention. The user account is also operable to submit information to the platform relating to fan status, e.g., why the user associated with the user account is a fan of the team. In one embodiment, the certificate is then validated by an authority, e.g., the sports team, the sports league, and/or the player before the certificate is distributed to the user.

In another non-limiting example, a user account is operable to access a digital certificate using a physical certificate. The physical certificate includes identifying indicia, including but not limited to a serial number and/or a tag. The user account is operable to enter the identifying indicia via a user device. The platform is then operable to validate that the identifying indicia corresponds to a certificate. If the certificate is valid, the platform is operable to display the digital certificate corresponding to the physical certificate on the user device.

Data Stored on a Blockchain

In a preferred embodiment, the platform is operable to store the user data, the user accounts, the certificates, and additional platform data on a distributed ledger, e.g., a blockchain. Platform data includes data collected by the data collection engine as well as transactions (e.g., buying, selling, and/or trading of goods) and interactions (e.g., messages exchanged) on the platform. Distributed ledger technology refers to an infrastructure of replicated, shared, and synchronized digital data that is decentralized and distributed across a plurality of machines, or nodes. The nodes include but are not limited to a mobile device, a computer, a server, and/or any combination thereof. Data is replicated and synchronized across the plurality of nodes such that each node has a complete copy of the data ledger. The replication and synchronization of data across a distributed set of devices provides increased transparency over traditional data storage systems as multiple devices have access to the same set of records and/or database. Additionally, the use of distributed ledgers eliminates third-party and/or administrative authorities in that all of the nodes in the system are operable to receive, validate, and store additional data, thus creating a truly decentralized system. Eliminating the third party saves time and cost. A decentralized database is also more secure than traditional databases, which are stored on a single device and/or server, because a decentralized database is more difficult to attack and/or irreparably tamper with the data as the decentralized data is replicated and spread out over both physical and digital space to segregated and independent nodes.

In addition to the decentralized storage of the distributed ledger, which requires a plurality of nodes, the distributed ledger has further advantages in the way that data is received, validated, communicated, and added to the ledger. When new data is added to the distributed ledger, it must be validated by a portion of the nodes (e.g., 51%) involved in maintaining the ledger in a process called consensus. Proof of work, proof of stake, delegated proof of stake, proof of space, proof of capacity, proof of activity, proof of elapsed time, and proof of authority consensus are all compatible with the present invention, as are other forms of consensus known in the art. In one embodiment, the present invention uses fault-tolerant consensus systems. Each node in the system is operable to participate in consensus, e.g., by performing at least one calculation, performing at least one function, allocating compute resources, allocating at least one token, and/or storing data. All nodes are operable to participate in consensus. It is necessary for a portion of the nodes in the system (e.g., 51% of the nodes) to participate in consensus in order for new data to be added to the distributed ledger. Advantageously, requiring that the portion of the nodes participate in consensus while all nodes are operable to participate in consensus means that authority to modify the ledger is not allocated to one node or even a group of nodes but rather is equally distributed across all of the nodes in the system.

Figure 11:
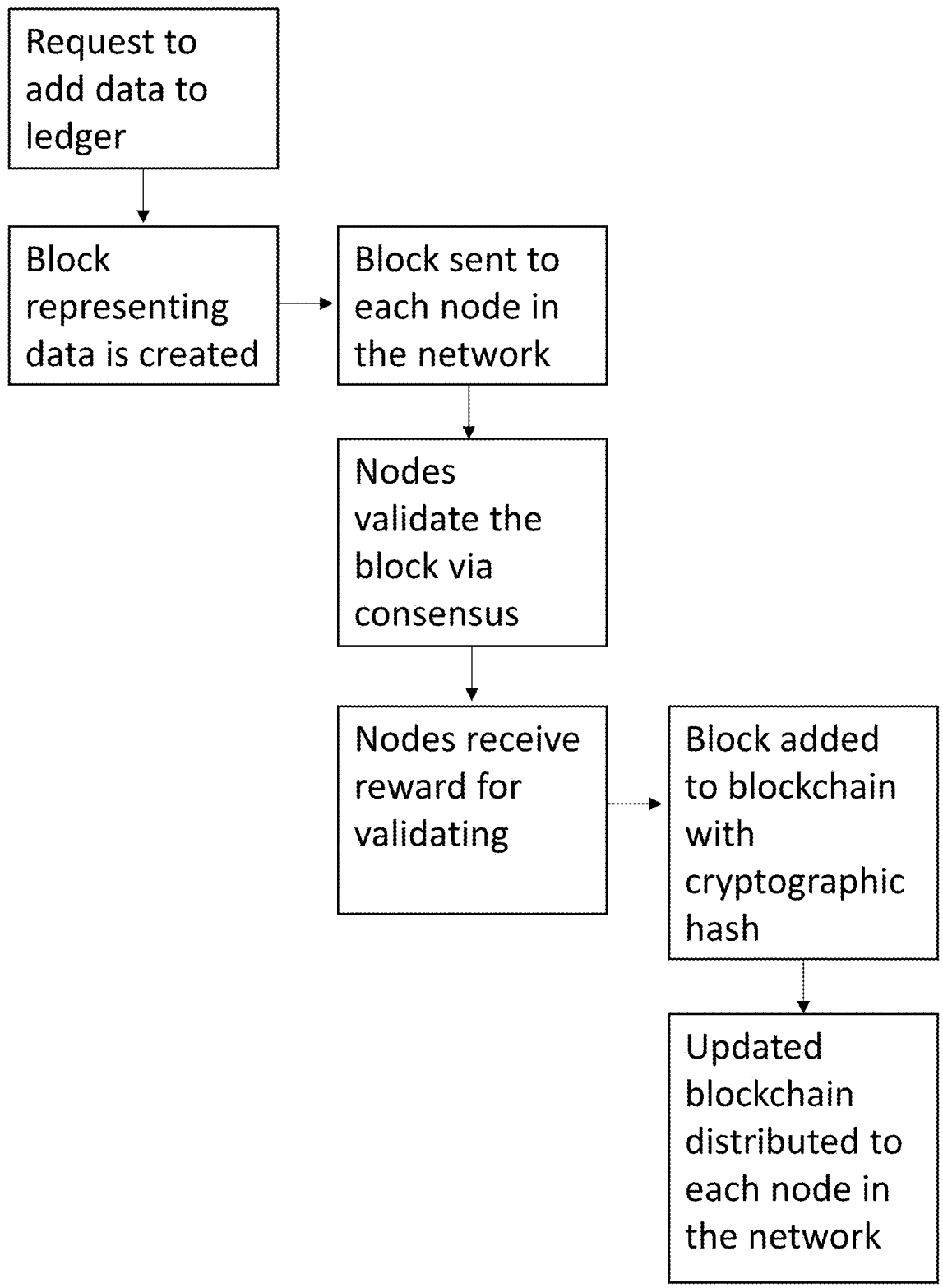
FIG. 11 illustrates an example workflow of adding data to the blockchain in the present invention.

The blockchain is a commonly used implementation of a distributed ledger and was described in Satoshi Nakamoto's whitepaper "Bitcoin: A Peer-to-Peer Electronic Cash System," which was published in 2008 and which is incorporated herein by reference in its entirety. In the blockchain, additional data is added to the ledger in the form of a block. Each block is linked to its preceding block with a cryptographic hash, which is a one-way mapping function of the data in the preceding block that cannot practically be computed in reverse. The computation of the cryptographic hash based on data in a preceding block is also a computationally intensive task that could not practically be conducted as a mental process. The cryptographic hashes means that each block is sequentially related to the block before it and the block after it, making the chain as a whole immutable. Data in a block in a preferred embodiment cannot be retroactively altered after it is added to the chain because doing so changes the associated hash, which affects all subsequent blocks in the chain. The blockchain is an improvement on existing methods of data storage because it connects blocks of data in an immutable fashion that is time-dependent. Additionally, the blockchain is then replicated and synchronized across all nodes in the system, ensuring a distributed ledger. Any attempted changes to the blockchain are propagated across a decentralized network, which increases the responsiveness of the system to detect and eliminate fraudulent behavior compared to non-distributed data storage systems. The blockchain and the distributed ledger solve problems inherent to computer networking technology by providing a secure and decentralized way of storing data that is immutable and has high fault tolerance. The distributed ledger stores digital data and is thus inextricably tied to computer technology. FIG. 11 illustrates an example workflow of adding data to the blockchain in the present invention.

In one embodiment, the data added to the distributed ledger of the present invention include digital signatures. A digital signature links a piece of data (e.g., a block) to a digital identity (e.g., a user account). In one embodiment, the digital signature is created using a cryptographic hash and at least one private key for a user. The content of the piece of data is used to produce a cryptographic hash. The cryptographic hash and the at least one private key are used to create the digital signature using a signature algorithm. The digital signature is only operable to be created using a private key. However, the digital signature is operable to be decoded and/or verified using a public key corresponding to the user. The separation of public keys and private keys means that external parties can verify a digital signature of a user using a public key while the security of the digital signature is maintained because external parties do not have the private keys necessary to create the digital signature of the user. Digital signatures are not merely electronic analogs of traditional physical signatures. Physical signatures are easily accessible and easily forged based on visual inspection. In addition, there is no standard algorithm to verify a physical signature except comparing a first signature with a second signature from the same person via visual inspection, which is not always possible. In one embodiment, the digital signatures are created using the data that is being linked to the digital identity whereas physical signatures are only related to the identity of the signer and are agnostic of what is being signed. Furthermore, digital signatures are transformed into a cryptographic hash using a private key, which is a proof of identity of which there is no physical or pre-electronic analog. Digital signatures, and cryptographic hashes in general, are of sufficient data size and complexity to not be understood by human mental work, let alone verified through the use of keys and corresponding algorithms. Therefore, creating, decoding, and/or verifying digital signatures with the human mind is highly impractical.

Public, private, consortium, and hybrid blockchains are compatible with the present invention. In one embodiment, the blockchain system used by the present invention includes sidechains wherein the sidechains run parallel to a primary chain. Implementations of distributed ledger and/or blockchain technology including but not limited to BITCOIN, ETHEREUM, HASHGRAPH, BINANCE, FLOW, TRON, TEZOS, COSMOS, and/or RIPPLE are compatible with the present invention. In one embodiment, the present invention further includes the use of at least one smart contract, wherein a smart contract includes a set of automatically executable steps and/or instructions that are dependent on agreed upon terms. In one embodiment, the at least one smart contract is deployed on a blockchain such that the at least one smart contract is also stored on a distributed node infrastructure. In one embodiment, the terms of the at least one smart contract are dependent on changes to the blockchain; e.g., a provision of the at least one smart contract executes when a new block is added to the blockchain that meets the terms of the at least one smart contract. In one embodiment, a first smart contract is operable to invoke a second smart contract when executed. A smart contract is operable to capture and store state information about the current state of the blockchain and/or the distributed ledger at any point in time. Advantageously, a smart contract is more transparent than traditional coded contracts because it is stored on a distributed ledger. Additionally, all executions of the smart contract are immutably stored and accessible on the distributed ledger, which is an improvement over non-distributed coded contracts. In one embodiment, the state information is also stored on a distributed ledger. A distributed ledger further enables the use of cryptocurrencies as well as creation and management of non-fungible tokens (NFT) in the present invention.

Digital Collectibles

In one embodiment, the platform includes a digital inventory of digital collectibles owned by a user account wherein the digital collectibles include the digital certificates, digital art, memorabilia, equipment, tokens, a prize (e.g., a trophy, a statue, a medal, an emblem), and/or souvenirs. In one embodiment, the digital collectibles are linked to physical collectibles. For example, a digital collectible is a digital representation (e.g., a photo, a model, a schematic) of a physical collectible. The relationship between the digital collectible and the physical collectible is in one embodiment stored in the digital inventory. Associating a digital collectible with a physical collectible provides a method for authenticating and verifying the origin and/or the ownership of the physical collectible. Alternatively, the digital collectible is purely digital and has no physical analog. In one embodiment, the digital inventory further stores rights and/or ownership data for each of the digital collectibles. The digital inventory is preferably stored on a blockchain.

In one embodiment, the platform is further operable to establish a digital gallery for visual display of digital collectibles. The digital gallery is in one embodiment a photo gallery accessible by a user device. Alternatively, the digital gallery has the visual appearance of a structure or a room, e.g., a trophy case, an art gallery, a showroom, and/or a safe and is viewable on a user device. In yet another alternative, the digital gallery is a virtual reality (VR) space, an augmented reality (AR) space, and/or a mixed reality (MR) space. The digital gallery enables users to explore a collection of digital certificates and/or collectibles using a user device. A user device is operable to access a digital gallery associated with a user account and navigate through the digital gallery to view all of the displayed digital collectibles. A user account is operable to create and modify the digital gallery in order to arrange the digital collectibles to their satisfaction. In one embodiment, the user account is also operable to selectively present the digital collectibles and/or to include security measures to control access to the digital gallery.

As a non-limiting example, the platform is operable to create an AR digital gallery wherein the camera of the user device is used to view and navigate through a physical space. The user device in one embodiment includes a VR/AR device, e.g., a headset. The platform is operable to create visual representations of the digital collectibles on a viewing device of the user device in real time such that the user device displays the digital collectibles as an augmented view of the physical space visible to the camera. In one embodiment, the digital collectibles in the digital gallery are not static images but rather are a graphics interchange format (GIF) file, a video, an audio sample, a 3D object, and/or an animation. Alternatively, the digital collectibles are interactive and can be used in a digital environment. For example, a baseball bat associated with a specific baseball player is a digital collectible owned by a user account on the platform. The user account is then operable to use the baseball bat in a baseball video game, and the baseball bat conveys certain characteristics and/or skills associated with the baseball player. As an alternative example, a digital collectible is a uniform, wherein the uniform is operable to be used as a player skin in an electronic sports (e-sports) game.

In one embodiment, a digital collectible is operable to be split into a plurality of digital collectibles, wherein each of the plurality of digital collectibles is operable to be owned by a different user account. Alternatively, a single digital collectible is operable to be partially owned by a plurality of user accounts. In another embodiment, the platform is operable to create a plurality of digital collectibles based on a single physical collectible wherein each of the plurality of digital collectibles is operable to be owned by a different user account. For example, a sports team wins a championship and receives a trophy. The trophy is a physical good that is not divisible. However, the platform of the present invention is operable to create a digital trophy corresponding to the physical trophy wherein the digital trophy is co-owned by a plurality of user accounts based on fan status. Alternatively, the platform is operable to create a plurality of digital trophies corresponding to the physical trophy wherein each of the plurality of digital trophies is operable to be owned by a user account. In another embodiment, the platform is operable to offer physical collectibles based on digital collectibles, e.g., a physical medal to a user wherein the user account of the user has ownership of a digital medal.

In one embodiment, the digital collectible is a piece of digital media including but not limited to an image, a video, an audio sample, and/or a GIF. For example, the digital collectible is a video of a point being scored at a sports game. The digital media is operable to be captured from a live in-person event and/or from a broadcast. As another non-limiting example, the digital collectible is a GIF of a dunk taken from a broadcast of a basketball game with a plurality of camera angles. In one embodiment, the platform is operable to detect and identify the content of the digital media including but not limited to a player, a team, an opponent, an action, an event, a game, a location, an angle, a source, and/or a vantage point. In one embodiment, the platform is operable to use computer vision and/or machine learning to identify the content of the digital media. Alternatively, the platform is operable to use metadata, user data, and/or fan data to identify the content of the digital media. The platform is then operable to assign metadata to the digital media and categorize the digital media. Categorizing the digital media facilitates displaying, searching, viewing, selling, trading, and/or purchasing the digital media.

In one embodiment, the platform is operable to attach a non-fungible token (NFT) to the digital collectible. A non-fungible token is a unique piece of data that is stored on a digital ledger and that can thus be used to represent a physical and/or a digital asset, e.g., in a transaction, in an inventory. Because an NFT is unique, it certifies the identity and uniqueness of the associated asset. The token itself consists in one embodiment of cryptographic hashes of a chain of data blocks. The token is non-fungible in that a first token is not directly interchangeable with a second token; rather, the value of the first token and the value of the second token are determined in terms of a fungible unit (e.g., a cryptocurrency). In one embodiment, the platform is operable to allow a user account to attach an NFT to a digital collectible in a minting process. In order to mint an NFT, a user account is connected to a digital wallet. The digital wallet is in one embodiment a third-party digital wallet (e.g., METAMASK, TRUST WALLET, COINBASE) that is integrated into and/or accessible by the platform of the present invention. Alternatively, the digital wallet is created and hosted by the platform of the present invention. When the user account is connected to the digital wallet, the user account is operable to upload the digital collectible, e.g., as a file. The user account is operable to edit the digital collectible and/or descriptive data such as metadata regarding the digital collectible. The user account is also operable in one embodiment to edit the parameters of the digital collectible and/or its associated NFT, including but not limited to a scarcity, a uniqueness, a number of copies, an indivisibility, ownership data, copyright rules, a transparency, an interoperability, identification data, certificate data, and/or at least one token standard for creating NFTs. In one embodiment, the platform is operable to support all ETHEREUM Request for Comment (ERC) standards as described by the ETHEREUM Improvement Proposals (EIP). For example, the platform is operable to support EIP-721: ERC-721 Non-Fungible Token Standard, which was written by Entriken, et al., and published Jan. 24, 2018 and which is incorporated herein by reference in its entirety. Tokenization standards for blockchain platforms other than ETHEREUM are also compatible with the present invention. In one embodiment, the platform supports fractional NFTs (f-NFTs), wherein the platform is operable to split the non-fungible token such that a user account is operable to own a fraction of the non-fungible token and its corresponding asset.

Minting the NFT means that the token is stored on the distributed ledger (e.g., the blockchain) and is therefore immutable. The digital collectible is mapped to the token, and the token is stored in the digital wallet associated with the user account. In one embodiment, the token includes a cryptographic hash of data corresponding to the digital collectible. The digital collectible itself is preferably not stored in the digital wallet in order to allow for more efficient use of space in the digital wallet. In one embodiment, the platform of the present invention deploys at least one smart contract to handle minting of the NFT. In one embodiment, the parameters related to the NFT are accessible via the digital inventory and/or the digital gallery.

In one embodiment, a user account includes a media wallet. The media wallet is operable to store the NFT in a separate location from the digital wallet and is also stored on the blockchain. A separate media wallet is advantageous to separate access to fungible tokens (e.g., cryptocurrency) and non-fungible tokens. In one embodiment, the media wallet is operable to log media consumption data wherein the media consumption data includes views, shares, screenshots (including screen captures and/or screen recordings), comments, image data, video data, audio data, user data about a user account accessing the NFT, and/or web analytics related to the NFT. In one embodiment, the media wallet is further operable to manage access permissions to NFTs. In one embodiment, the access permissions are managed with at least one smart contract. The media wallet and the digital wallet are operable to be in communication with each other wherein the media wallet is operable to facilitate transactions of NFTs by accessing the digital wallet in order to send and/or receive fungible tokens in exchange for an NFT.

In one embodiment, the platform is operable to create an NFT in an automated manner. The platform is operable to recognize images, videos, and/or audio samples of value, save a piece of digital media based on the images, video, and/or audio samples of value, and tokenize the piece of digital media by minting an NFT and attaching the NFT to the piece of digital media. In one embodiment, the platform is operable to recognize the value of the piece of digital media by identifying at least one person, event, and/or context in the piece of digital media. Alternatively, the platform is operable to use fan metrics including but not limited to screenshots, recordings, replays, web analytics, social media engagement, social media trends, news stories, shares, reactions, applause, comments, discussion generated, and/or other metrics of enthusiasm to recognize the value of the piece of digital media. The platform is operable to analyze the fan metrics for trends, correlation, causation, and/or other statistical significance. The platform is then operable to create the NFT, set the parameters of the NFT and, in one embodiment, offer the NFT for sale in a marketplace based on the fan metrics.

Digital Tokens

In one embodiment, the digital collectibles includes a token. A token is a digital asset that represents a unit of value. Preferably, the token is fungible in that tokens are interchangeable with each other and that the value of a first token is not unique or different from the value of a second token. In one embodiment, the platform is operable to host token transactions using third-party tokens, including but not limited to cryptocurrencies (e.g., BITCOIN, ETHER, XRP, LITECOIN, STELLAR, BINANCE COIN), stablecoins, ERC tokens (e.g., ERC-20 tokens, ERC-721 tokens), Neo Enhancement Protocol (NEP) tokens, and/or Binance Chain Evolution Proposal (BEP) tokens. Alternate crypto tokens and tokenization standards are also compatible with the present invention. The platform is operable to host token transactions in compliance with existing and/or future standards. In one embodiment, the platform of the present invention is operable to create a platform token wherein the platform token is only available to user accounts on the platform. In one embodiment, the platform token is related to fan status. For example, a user account is awarded platform tokens when a user device associated with the user account is detected as having attended an event that increases fan status. In one embodiment, the digital collectible includes a token wherein the platform is operable to display the token in the digital gallery. Alternatively, a user account is operable to exchange the token for a benefit using the platform. As a non-limiting example, a user account is operable to amass tokens based on its social media engagement. The user account is then operable to exchange a plurality of tokens for preferred access to ticket sales for an upcoming sports game. Alternatively, a first user account is operable to exchange a plurality of tokens with a second user account in exchange for a digital collectible.

In one embodiment, the token represents ownership. In on embodiment, the token represents a security, a bond (e.g., a corporate bond), a stock, a stake, an option, a fund, and/or a share. The platform is therefore compliant with Securities and Exchange Commission (SEC) regulations. As a non-limiting example, a platform token is only available to user accounts on the platform and represents a stake, or partial ownership, in an entity, e.g., a sports team. Advantageously, granting a user account partial ownership in an entity increases the emotional investment of a user in the entity and also provides a way to itemize and measure support of the entity. In one embodiment, the user account is operable to purchase ownership tokens using currency including but not limited to fiat currency, cryptocurrency, and/or hard money. Alternatively, the user account is operable to purchase ownership tokens using a different token. The platform is then operable to facilitate purchases, transactions, and/or exchanges of ownership tokens as described in U.S. Patent Publication No. 2021/0192620 which was filed Dec. 18, 2020 and which is incorporated herein by reference in its entirety.

Marketplace for Digital Collectibles

In one embodiment, the present invention further includes a marketplace wherein user accounts are operable to buy, trade, and/or sell goods including digital assets, along with physical analogs to the digital assets in the embodiment wherein the physical analogs exist. In another embodiment, the marketplace also allows for transacting of purely physical assets. The present invention is preferably operable to allow for exchange of a plurality of types of assets (e.g., digital collectibles, tokens, cryptocurrencies) on a blockchain. As a non-limiting example, a first user account creates a digital collectible and attaches a non-fungible token to the digital collectible. The creation of the digital collectible and the corresponding non-fungible token is stored on the blockchain. The first user account then displays the digital collectible on the marketplace. A second user account submits a request to purchase the digital collectible. The first user account is attached to a first digital wallet, and the second user account is attached to a second digital wallet. If the first user account accepts the request, the second user account transfers a mutually agreed-upon sum from the first digital wallet to the second digital wallet. In one embodiment, a digital wallet is accessible to a user who is not the owner of the digital wallet via a public key. The digital wallet stores a private key wherein the private key is used to access tokens (e.g., cryptocurrency). Using the private key to transfer tokens from a first digital wallet to a second digital wallet includes in one embodiment accessing the first digital wallet with the private key and adding a block to the blockchain wherein the block stores details about the transaction including but not limited to the user accounts and/or digital wallets involved, an amount of the transaction, and/or a timestamp. The ownership of the digital collectible is then transferred from the first user account to the second user account wherein the transfer of ownership is recorded on the blockchain. In one embodiment, the transaction further includes the digital collectible being transferred from a first inventory associated with the first user account to a second inventory associated with the second user account. The inventory, and changes to the inventory, are recorded on the blockchain.

In one embodiment, the platform further includes an automated clearing house (ACH) wherein the ACH is operable to determine benefits and/or risks to a transaction, manage risks associated with the transaction, and/or facilitate the transaction. In one embodiment, the ACH is operable to use machine learning techniques to clear the transaction. In one embodiment, the transactions of digital assets are reversible. In one embodiment, the platform is operable to integrate an external payment application for transactions. A user account is operable to access the external payment application, provide the appropriate credentials, and/or execute a transaction using funds from the external payment application from the user interface of the platform. External payment applications include but are not limited to PAYPAL, STRIPE, VENMO, payment systems associated with a financial institution (e.g., a bank), and/or cryptocurrency payment systems. In another embodiment, the present invention further includes at least one cash register, and the platform is operable to facilitate cash transactions. The at least one cash register is operable to charge a user or a user account for the price of a good, collect the amount owed in cash, and log the transaction of the good. In one embodiment, the cash register is operable to automatically synchronize transaction logs with the platform to update the marketplace and/or inventories in real time or near real time. In one embodiment, the platform is operable to accept a combination of cash and digital payment for a good.

In one embodiment, the marketplace includes a primary marketplace and a secondary marketplace for the goods, e.g., digital collectibles. The primary marketplace is where the digital collectibles are transacted for the first time, wherein the digital collectibles have not previously been owned by a user account. The secondary marketplace is where digital collectibles that have been owned by a user account are transacted, e.g., resold. A secondary marketplace increases engagement with the digital collectibles and creates value for user accounts via price appreciation of the digital collectibles. In one embodiment, the marketplace includes auctions and bidding transactions. Alternatively, the marketplace is operable to enable negotiations between user accounts for the goods. In another embodiment, the marketplace further includes a tertiary marketplace wherein the tertiary marketplace includes black box goods, wherein the black box goods are random goods including but not limited to digital collectibles. The tertiary marketplace is operable to display the black box goods without showing their full contents, and user accounts are operable to transact the black box goods without knowing what a black box good comprises. In one embodiment, a black box good is a special edition good. The tertiary marketplace is operable to allow user accounts to transact the black box goods while maintaining the confidential nature of the contents of the black box good. Secret goods increase user interest and engagement, especially when the goods are special edition or collectible.

Figure 12:
FIG. 12 illustrates a certificates selection page according to one embodiment of the present invention.
Figure 13:
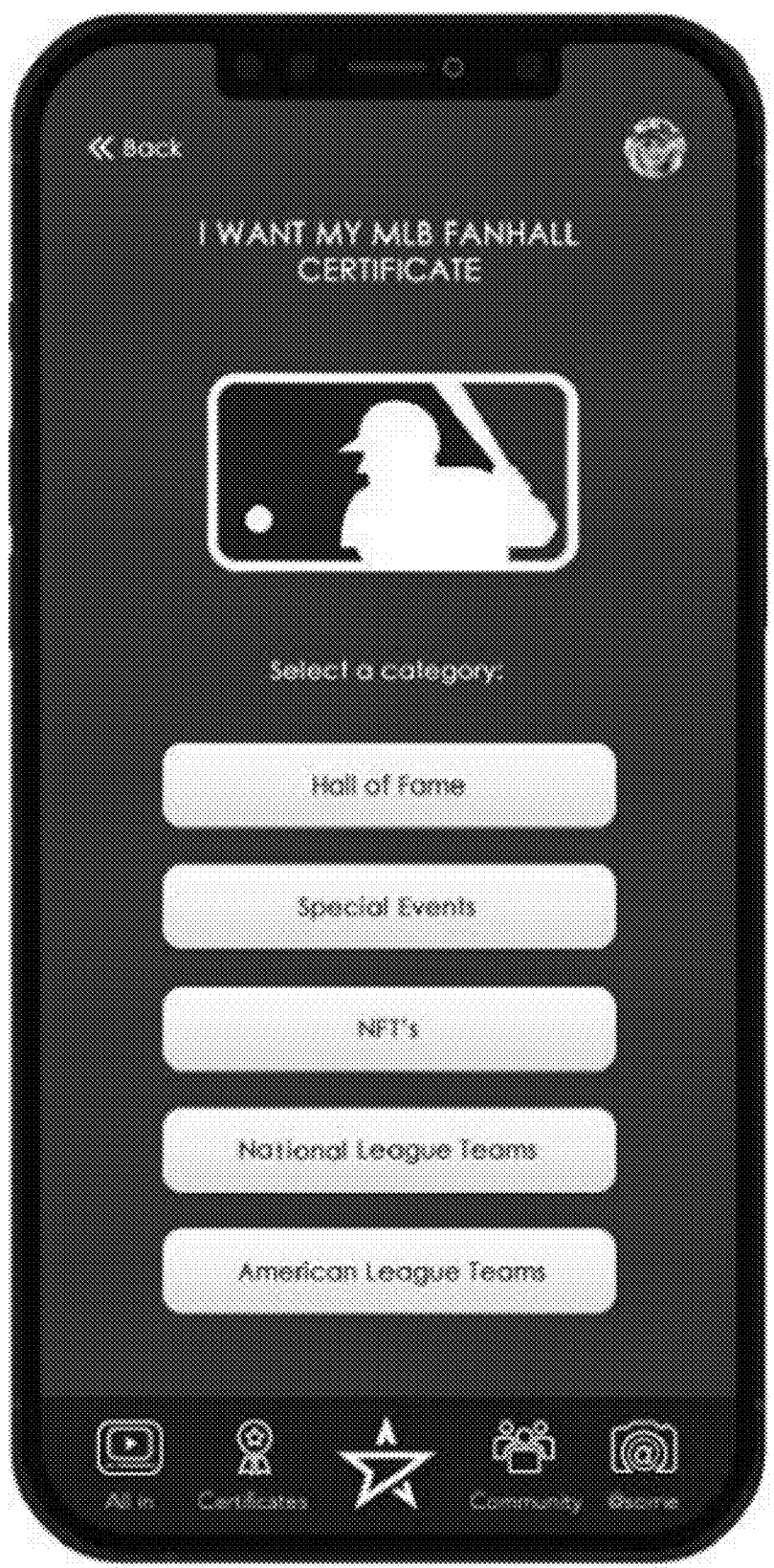
FIG. 13 illustrates a league certificates category selection page according to one embodiment of the present invention.
Figure 14:
FIG. 14 illustrates a team certificates category selection page according to one embodiment of the present invention.

FIG. 12 illustrates a certificates selection page of the mobile application. The certificates selection page includes a league icon and a team icon. Upon selection of the league icon, the mobile application displays certificates associated with the league. One embodiment of the categories of league certificates available for purchase is displayed in FIG. 13. Categories of certificates available for purchase include hall of fame certificates, special events certificates, NFT certificates, NATIONAL LEAGUE teams certificates, and AMERICAN LEAGUE teams certificates. Upon selection of the team icon in FIG. 12, the mobile application displays certificates associated with a team. FIG. 14 illustrates a GUI of the mobile application with categories of certificates available for purchase associated with the NEW YORK YANKEES. The categories displayed in FIG. 14 include the NY YANKEES team, players, legends, and special events. Certificates are operable to be purchased as digital art and/or as wall art.

Figure 15:
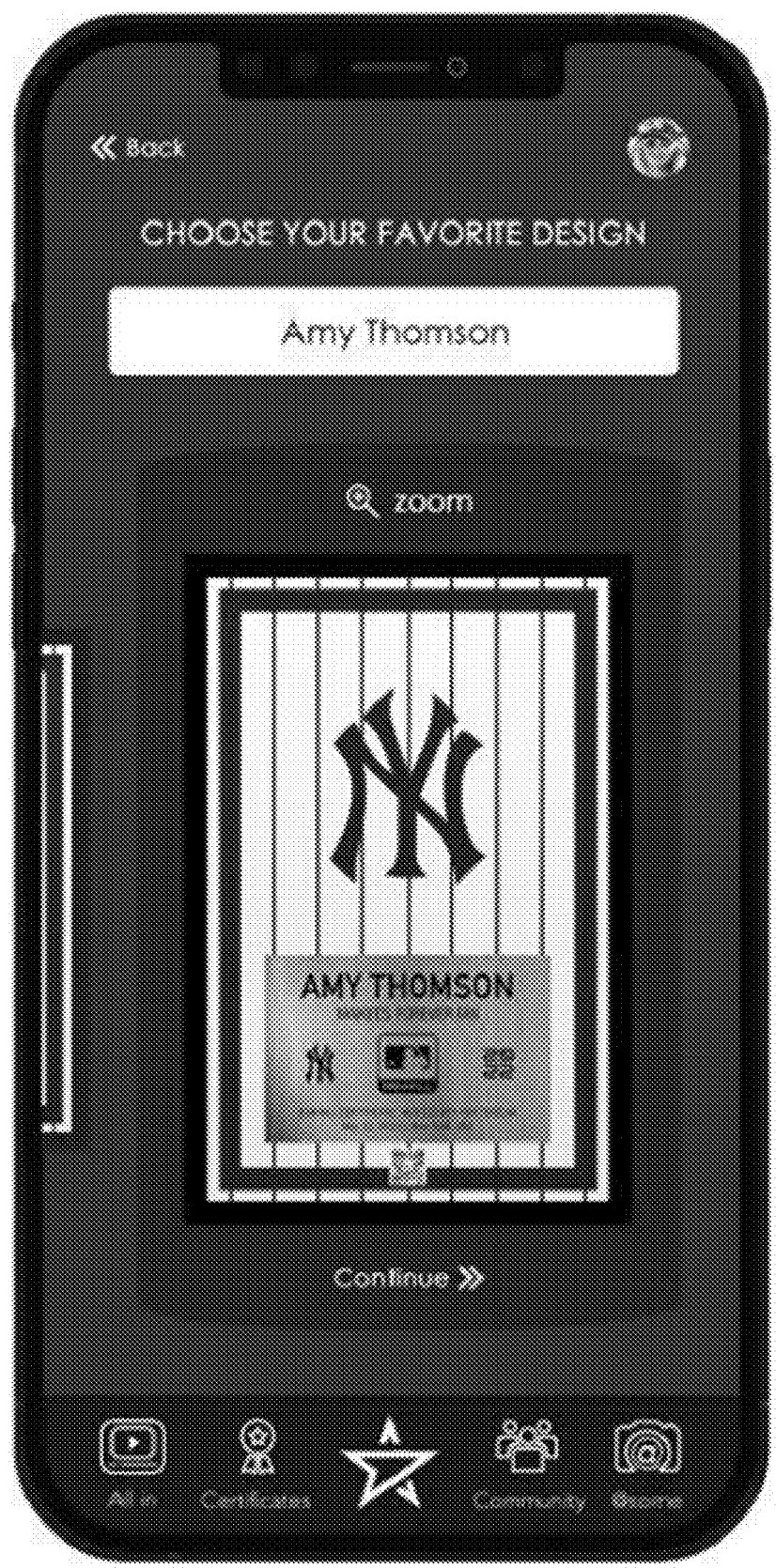
FIG. 15 illustrates a digital certificate design page according to one embodiment of the present invention.
Figure 16:
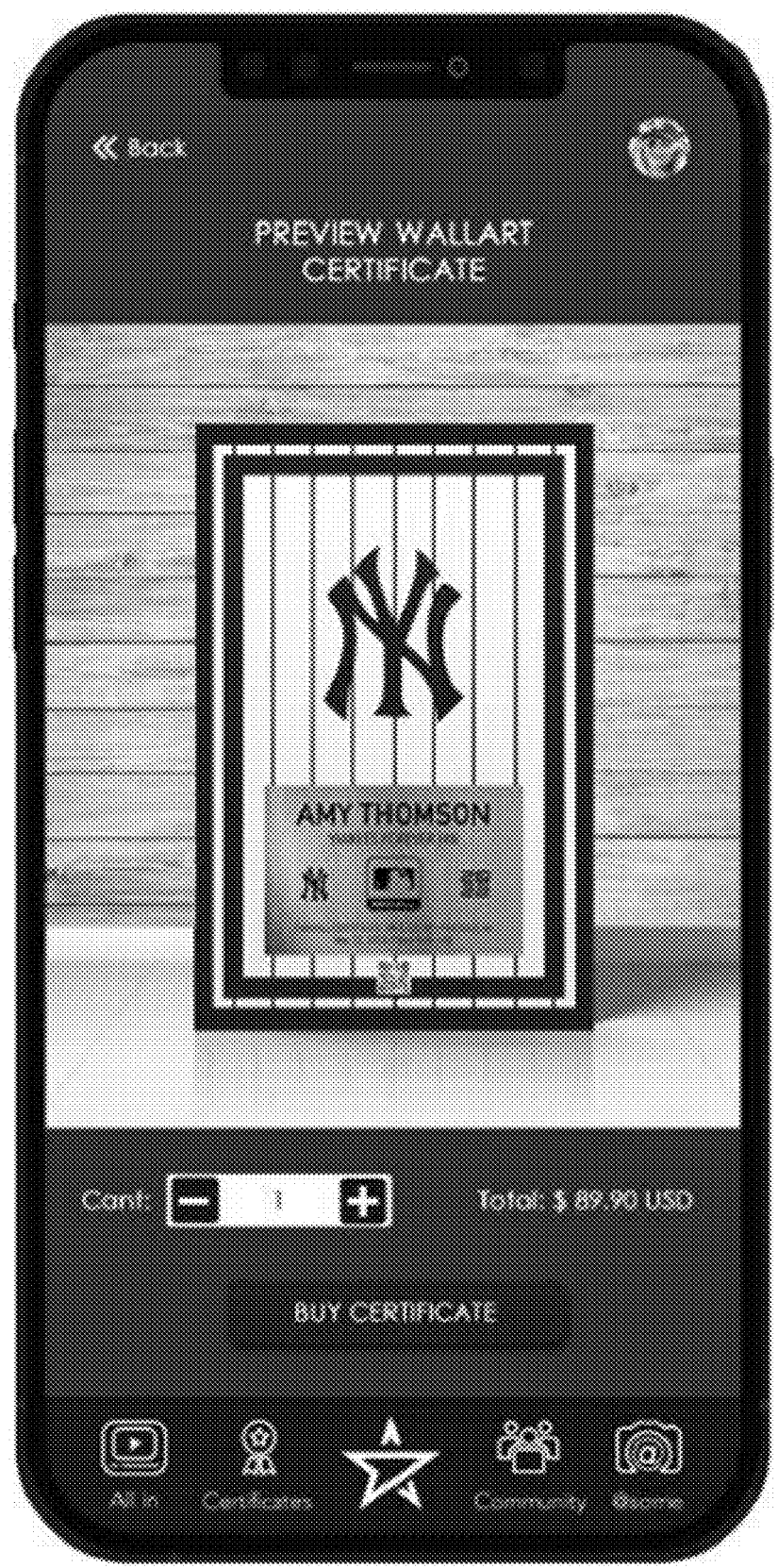
FIG. 16 illustrates a certificate preview page according to one embodiment of the present invention.

FIG. 15 illustrates a GUI of the mobile application for selecting a design for the digital certificate. Preferably, the certificate is customized for the fan. FIG. 16 illustrates a GUI of the mobile application providing for a preview of a certificate in the form of wall art. Upon selection of the Buy Certificate button, the GUI is operable to receive shipping and billing information. In one embodiment, alternative methods of payment such as APPLE PAY and PAYPAL are accepted as payment for the certificate.

Figure 17:
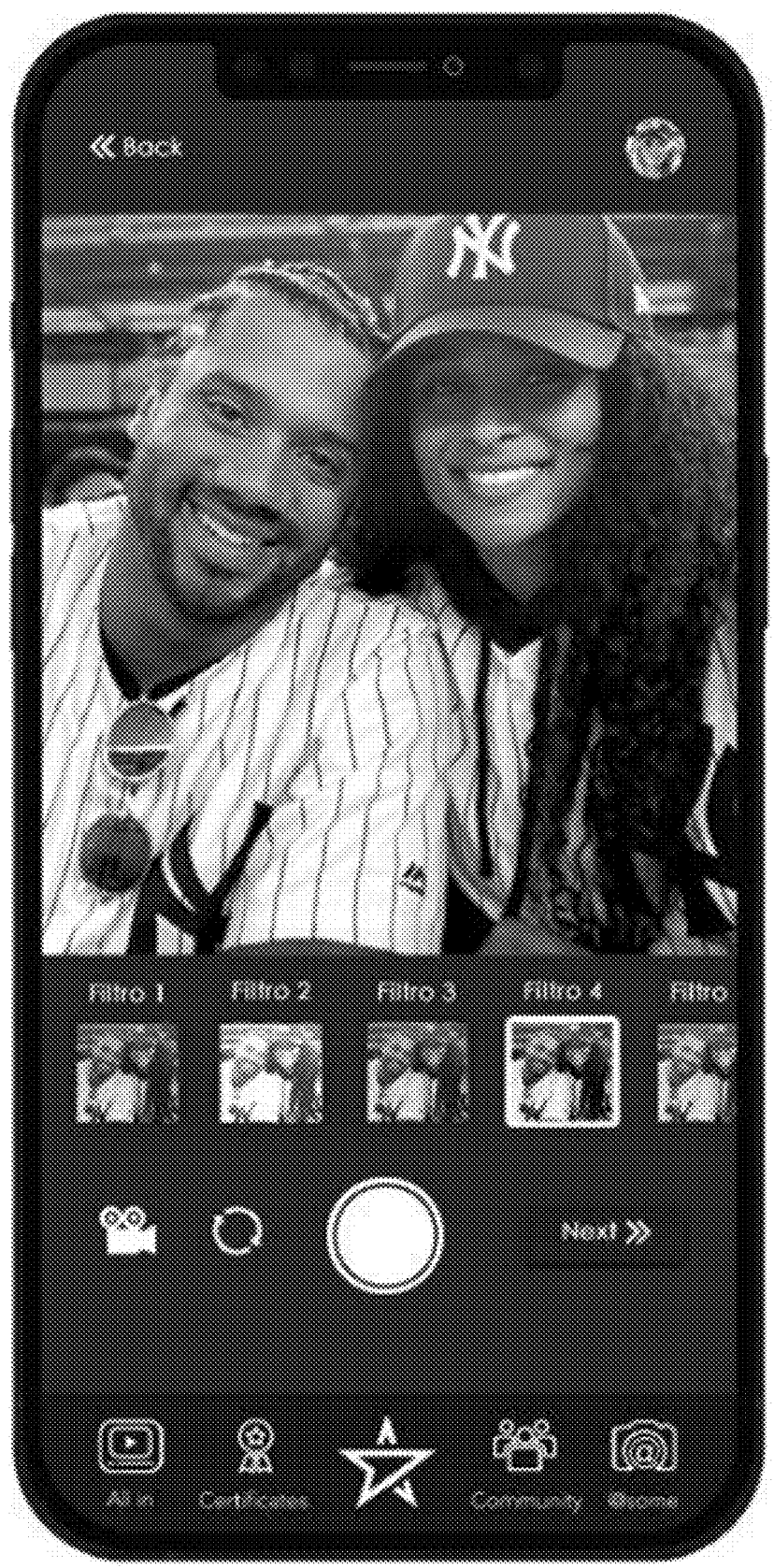
FIG. 17 illustrates a photo creation page according to one embodiment of the present invention.
Figure 18:
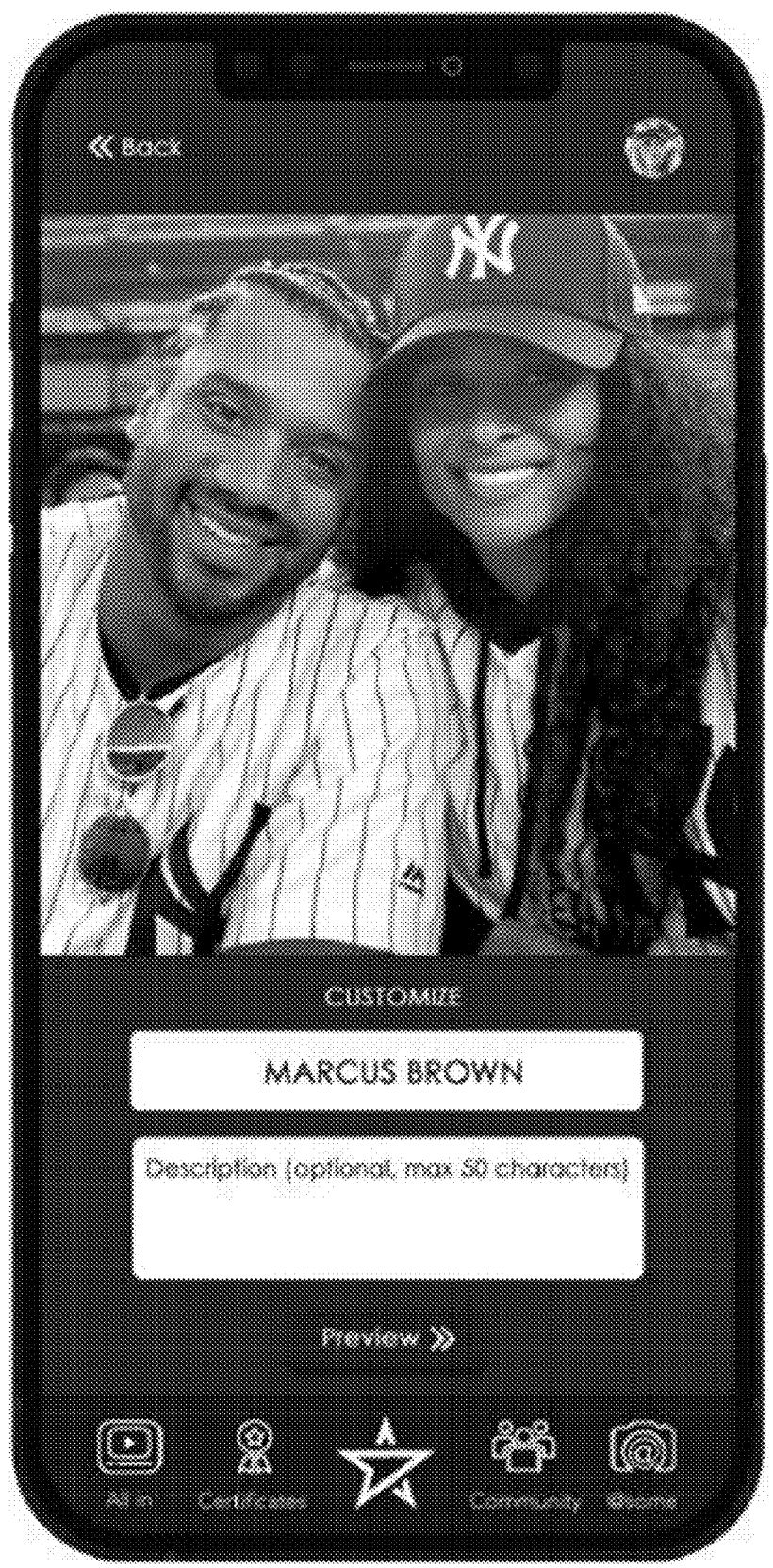
FIG. 18 illustrates a customized text creation page for a photo according to one embodiment of the present invention.
Figure 19:
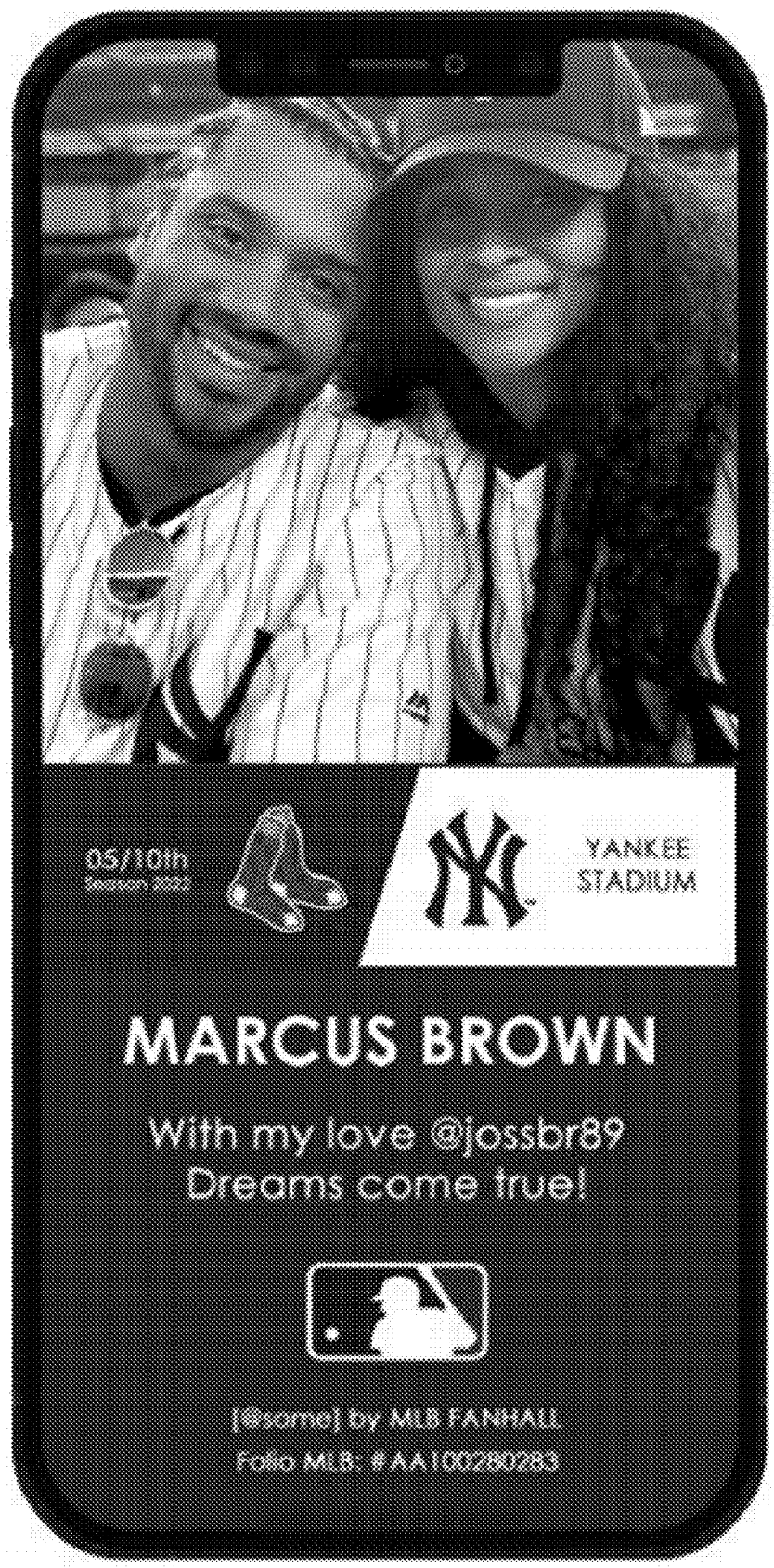
FIG. 19 illustrates a certificate created from the photo and customized text according to one embodiment of the present invention.

In one embodiment, the present invention provides for creating a certificate in real-time or near real-time. FIG. 17 illustrates a GUI of a photo with a variety of filters for creating an image for a certificate. The photo is operable to be retrieved from a local device or a third-party device or is operable to be obtained in real time or near real time immediately before creation of the certificate. FIG. 18 illustrates a GUI providing for customized text to be associated with the certificate. FIG. 19 illustrates a certificate created from the photo and the text. Advantageously, the location of the device running the application is automatically retrieved, and an image of the venue or the team associated with the location is automatically added to the certificate, along with an opposing team image if relevant. In one embodiment, more specific location information such as a seat number is retrieved via geolocation of the mobile device via any method known in the art or described herein, including but not limited to, GPS, cellular triangulation, and geofencing. In one embodiment, geofencing technology described in U.S. Pat. No. 10,979,849 or U.S. Pat. No. 10,582,333 is implemented to determine a geolocation of a device. Each of U.S. Pat. Nos. 10,979,849 and 10,582,333 are incorporated herein by reference in its entirety. In another embodiment, a ticket associated with the application is automatically analyzed and information about the stadium, seats, opposing team, etc. is retrieved. The certificate is operable to be purchased by the account which created the certificate in one embodiment.

Figure 20:
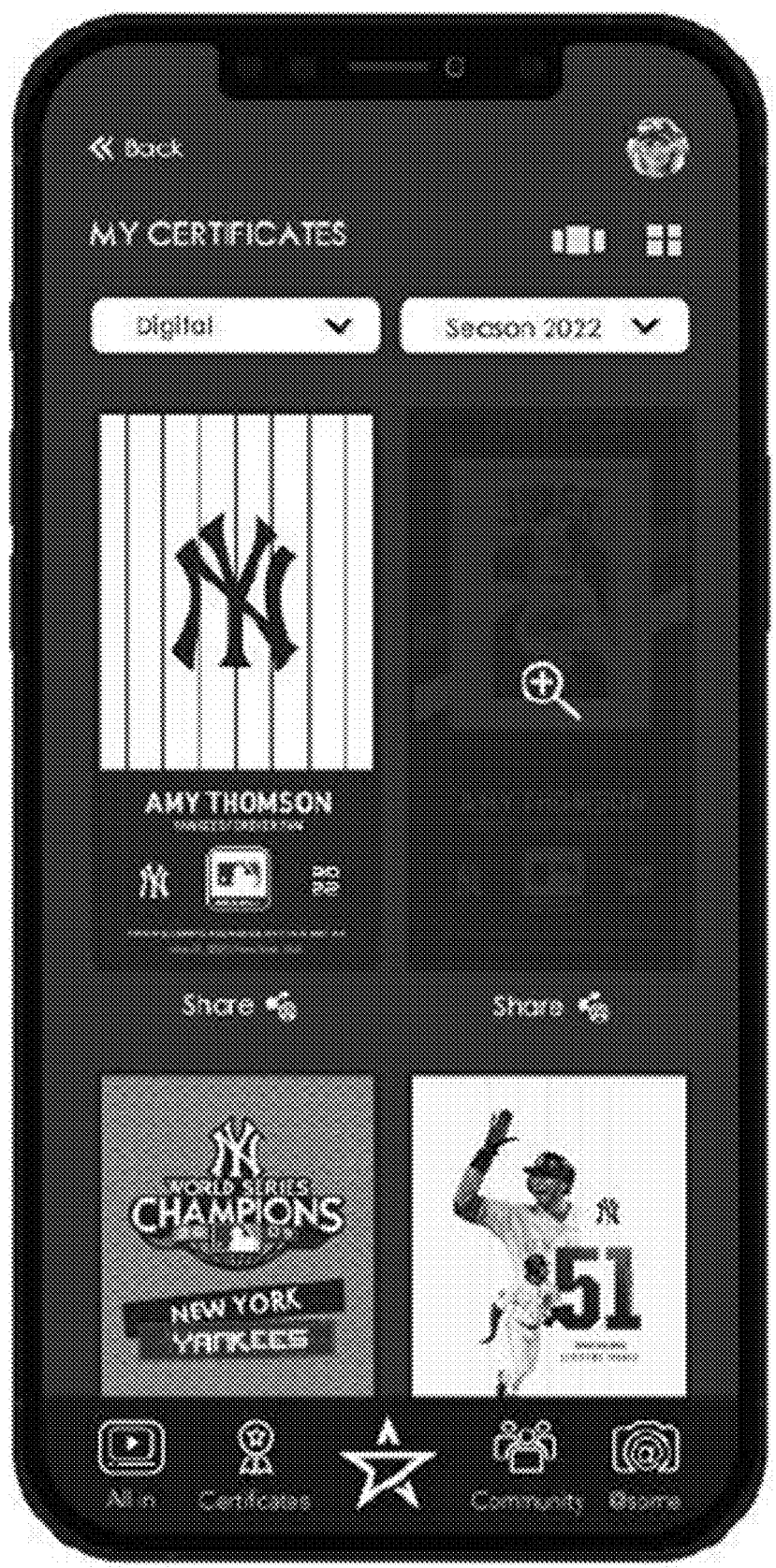
FIG. 20 illustrates a certificates page according to one embodiment of the present invention.
Figure 21:
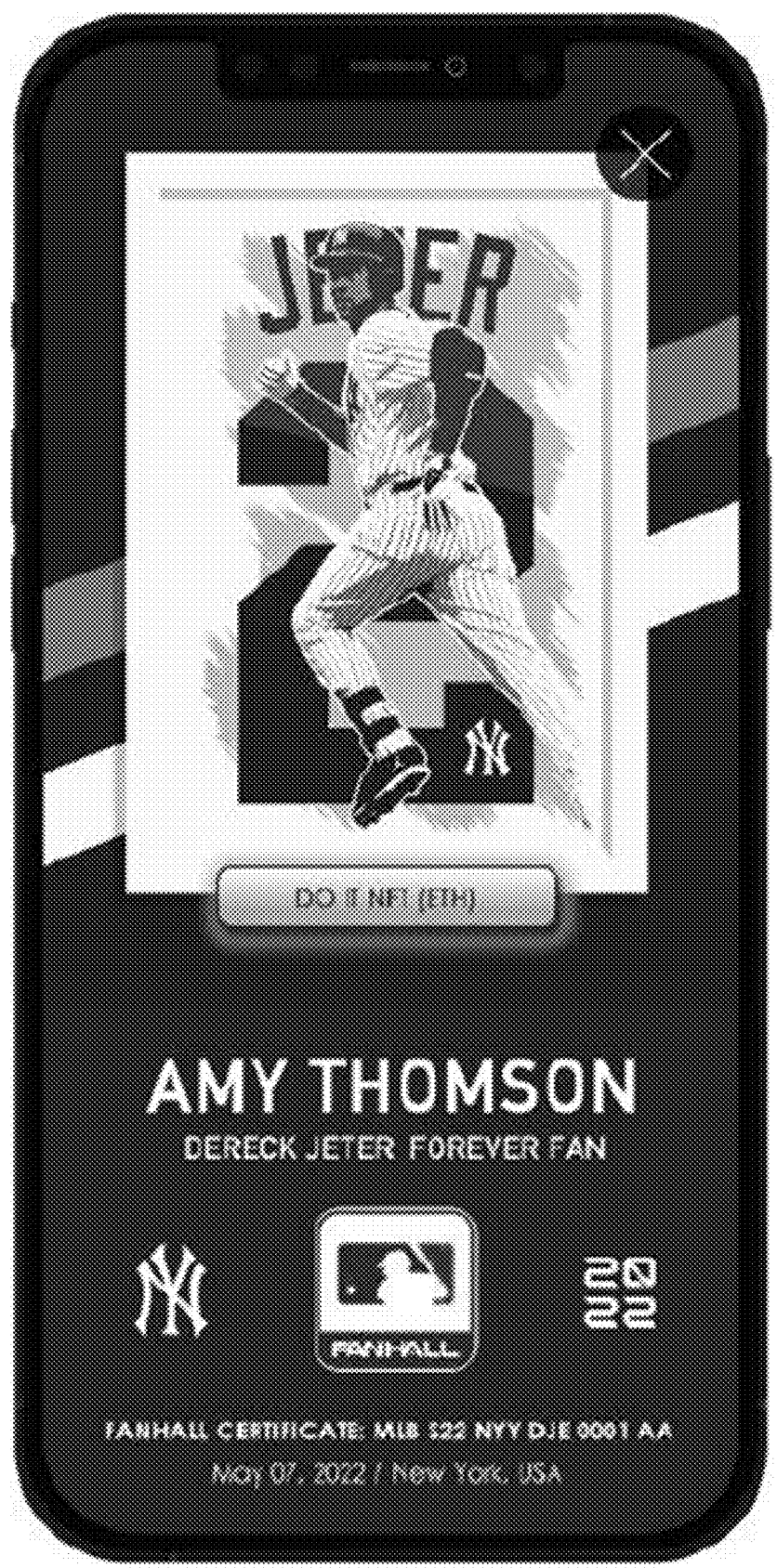
FIG. 21 illustrates a certificate which is operable to be converted into an NFT according to one embodiment of the present invention.

FIG. 20 illustrates a certificates page for a user account. The certificates page provides for filtering certificates by type (ex: digital, wall art, and NFTs), and by time period (ex: 2022 season, 2021 season, etc.). A certificate is operable to be selected on the GUI of the My Certificates page for conversion into an NFT. In one embodiment, only certain certificates are eligible for conversion into an NFT. FIG. 21 illustrates a certificate which is operable to be converted into an NFT. Upon activation of the "DO IT NFT" button, the conversion process for converting the certificate into an NFT is initiated.

Figure 22:
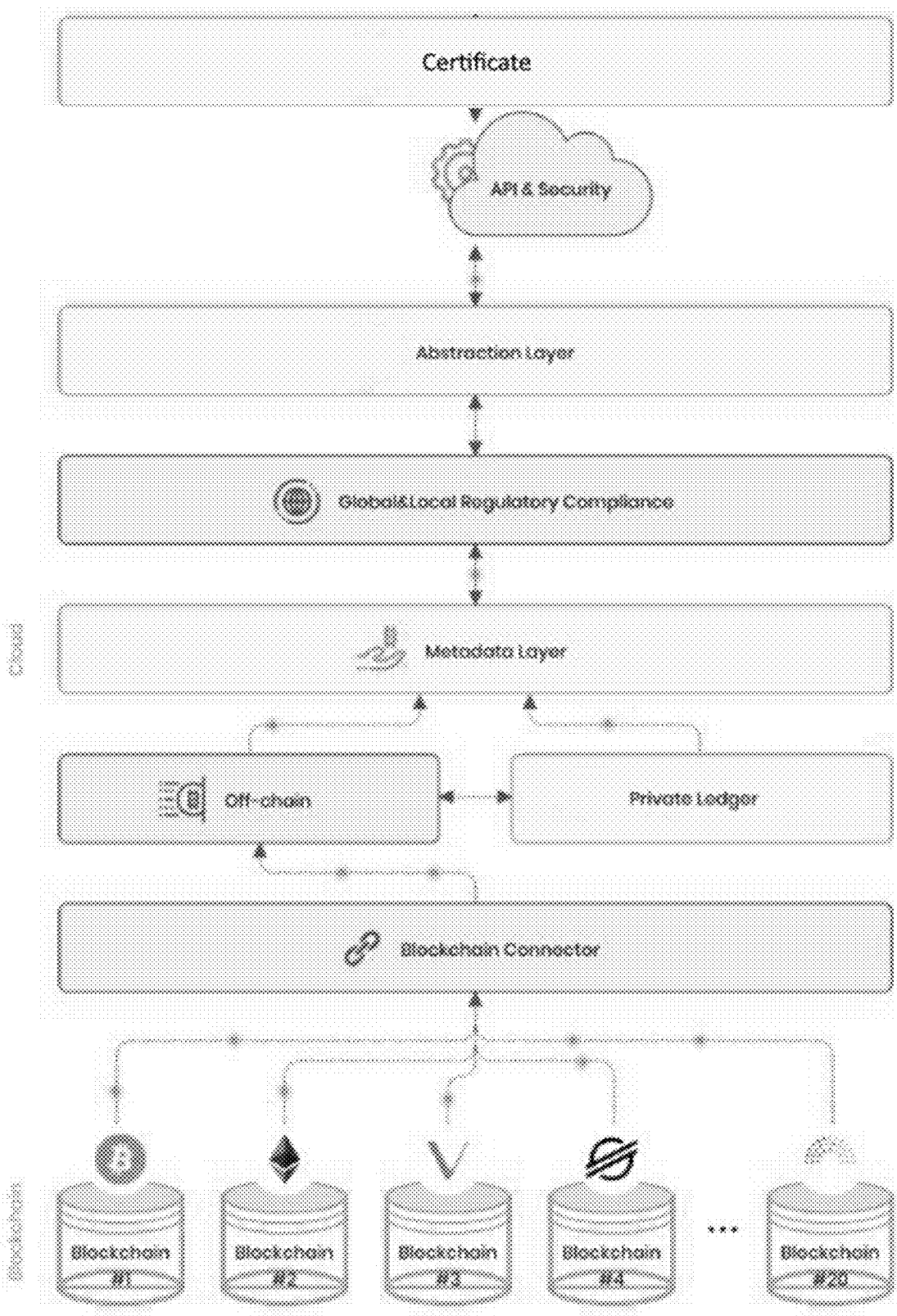
FIG. 22 illustrates a flowchart for converting a certificate to an NFT according to one embodiment of the present invention.

FIG. 22 illustrates a chart for creating an NFT from a certificate. The certificate is sent through an API and security to an abstraction layer, which processes the certificate and sends the certificate to a global and local regulatory compliance layer. The global and local regulatory compliance layer ensures that the transaction taking place follows the regulations set forth in the country where the user, who initiated the transaction, is located. Because regulations change frequently, the global and local regulatory compliance layer is updated regularly with the most up to date regulations. The global and local regulatory compliance layer then sends the certificate to a metadata layer where the certificate data is digitally tied to a block on a private ledger or a blockchain and stored on a cloud-based server platform. If the certificate is stored on a blockchain, then a blockchain connector is used to extract block data from a blockchain for storing the certificate data on a blockchain. Compatible blockchains include but are not limited to Bitcoin, Ethereum, VeChain, and/or Stellar blockchain.

Figure 23:
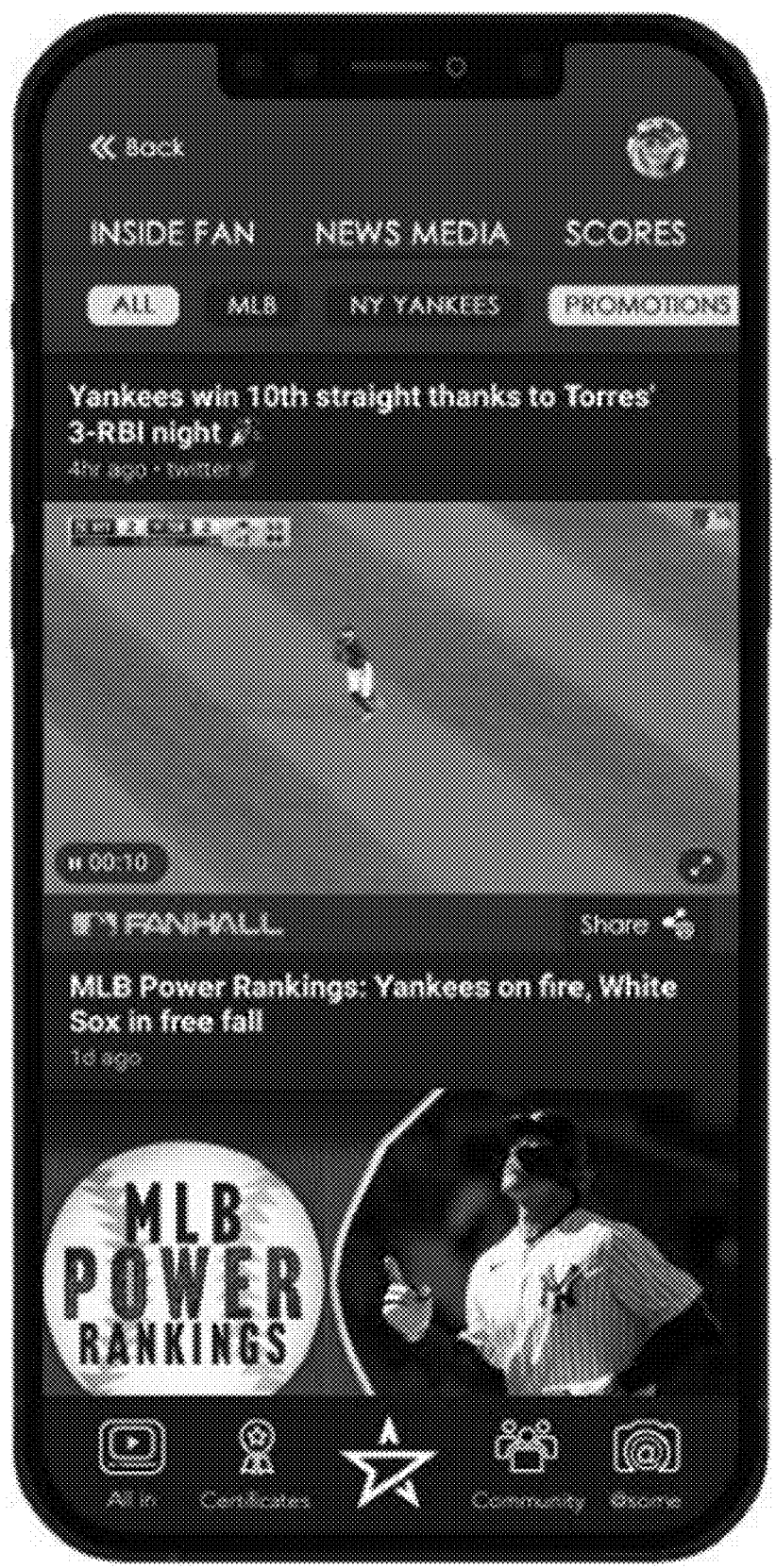
FIG. 23 illustrates a newsfeed according to one embodiment of the present invention.

FIG. 23 illustrates the "ALL IN" section of the mobile application which provides a news media page providing a feed of news stories aggregated from other sources. In one embodiment, the news feed is populated by a web crawler which searches the internet in real time or near real time for stories relating to a favorite team, a favorite league, or any other topics of interest indicated by a user or determined via artificial intelligence (AI) or machine learning (ML) by the server connected to the device running the mobile application. Each news story preferably includes one or more tags indicating the relevancy of the news story to the interests of the user. The news stories are sortable by predetermined categories determined based on user preferences. For example, in FIG. 23, the categories are "ALL", "MLB", and "NY YANKEES". The application provides functionality for sharing links to news articles with other users on the platform or sharing the links with an associated third-party social media account. The scores section of the application provides scores for the league and/or team the user follows or is associated with through their profile.

Figure 24:
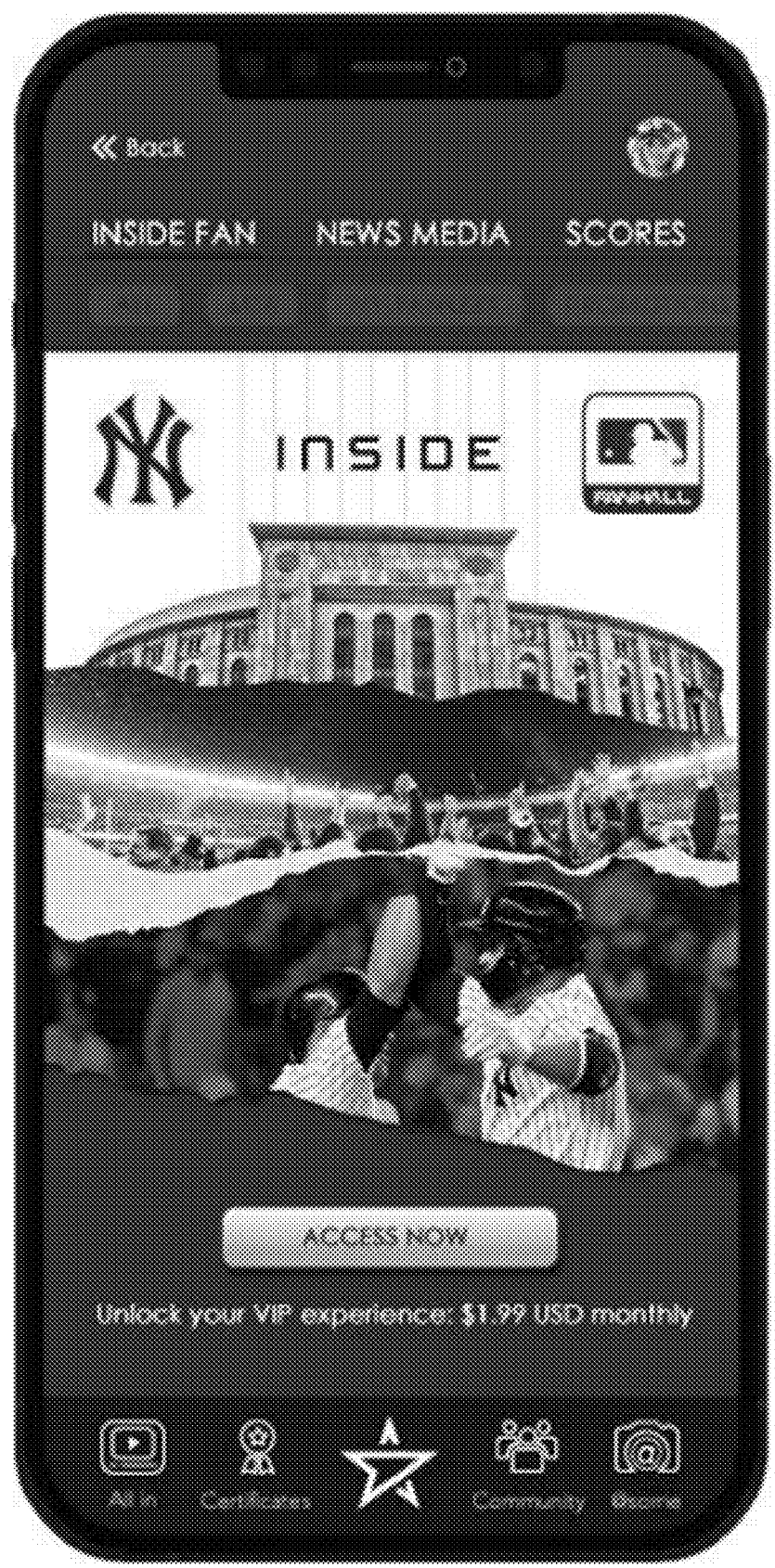
FIG. 24 illustrates an inside access home page according to one embodiment of the present invention.
Figure 25:
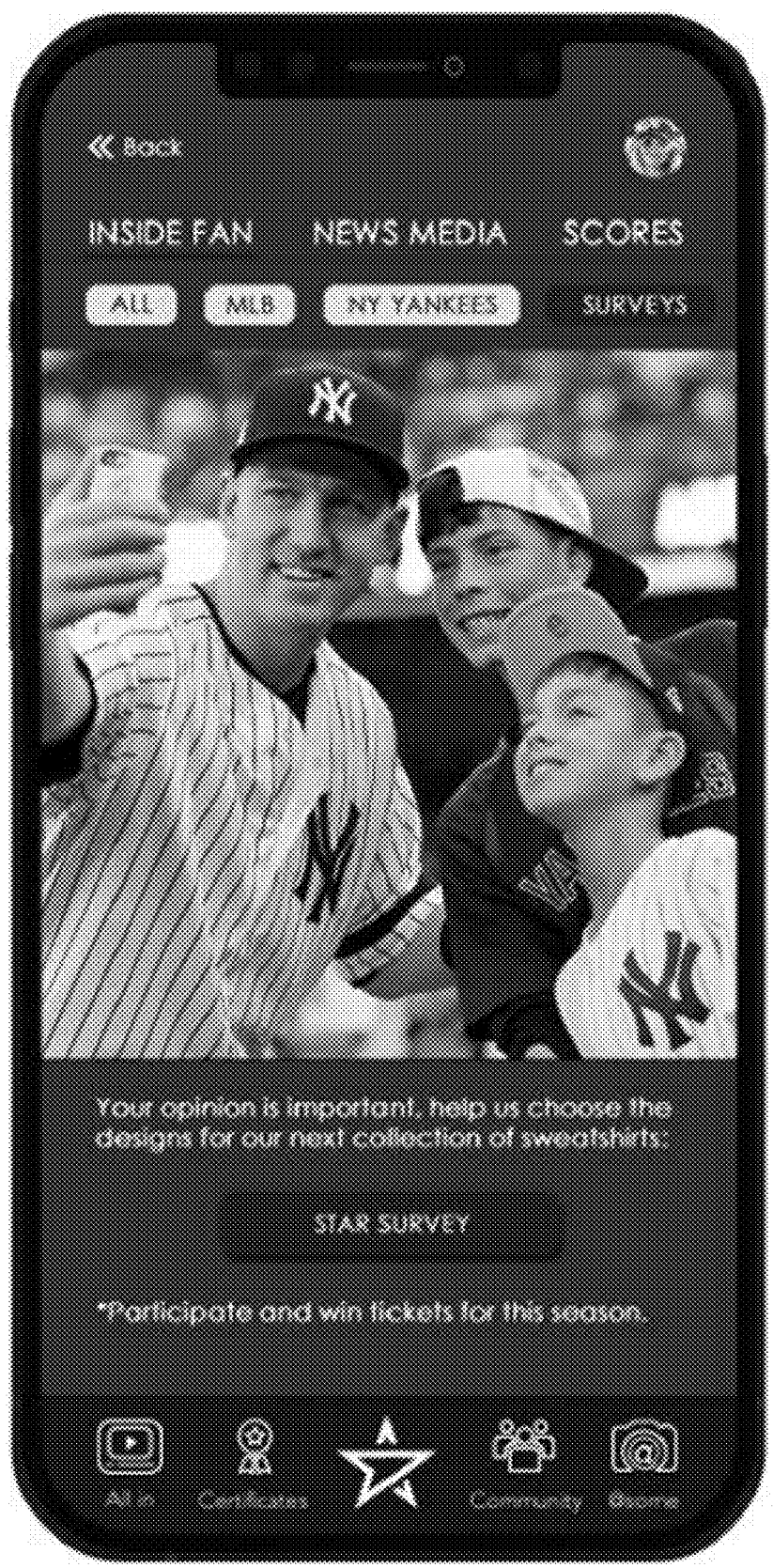
FIG. 25 illustrates a survey page according to one embodiment of the present invention.

FIG. 24 illustrates an inside access home page. Inside access functionality provides exclusive benefits to fans, including the ability to unlock VIP experiences, access exclusive promotions, games, and more. In one embodiment, the inside access provides connections with player accounts or team accounts created through the mobile application. FIG. 25 illustrates a survey page accessed through an inside access page. The survey referenced in FIG. 25 relates to a survey to choose designs for a next collection of team sweatshirts. One or more participants in the survey win tickets for the upcoming season based on participation in the survey.

Figure 26:
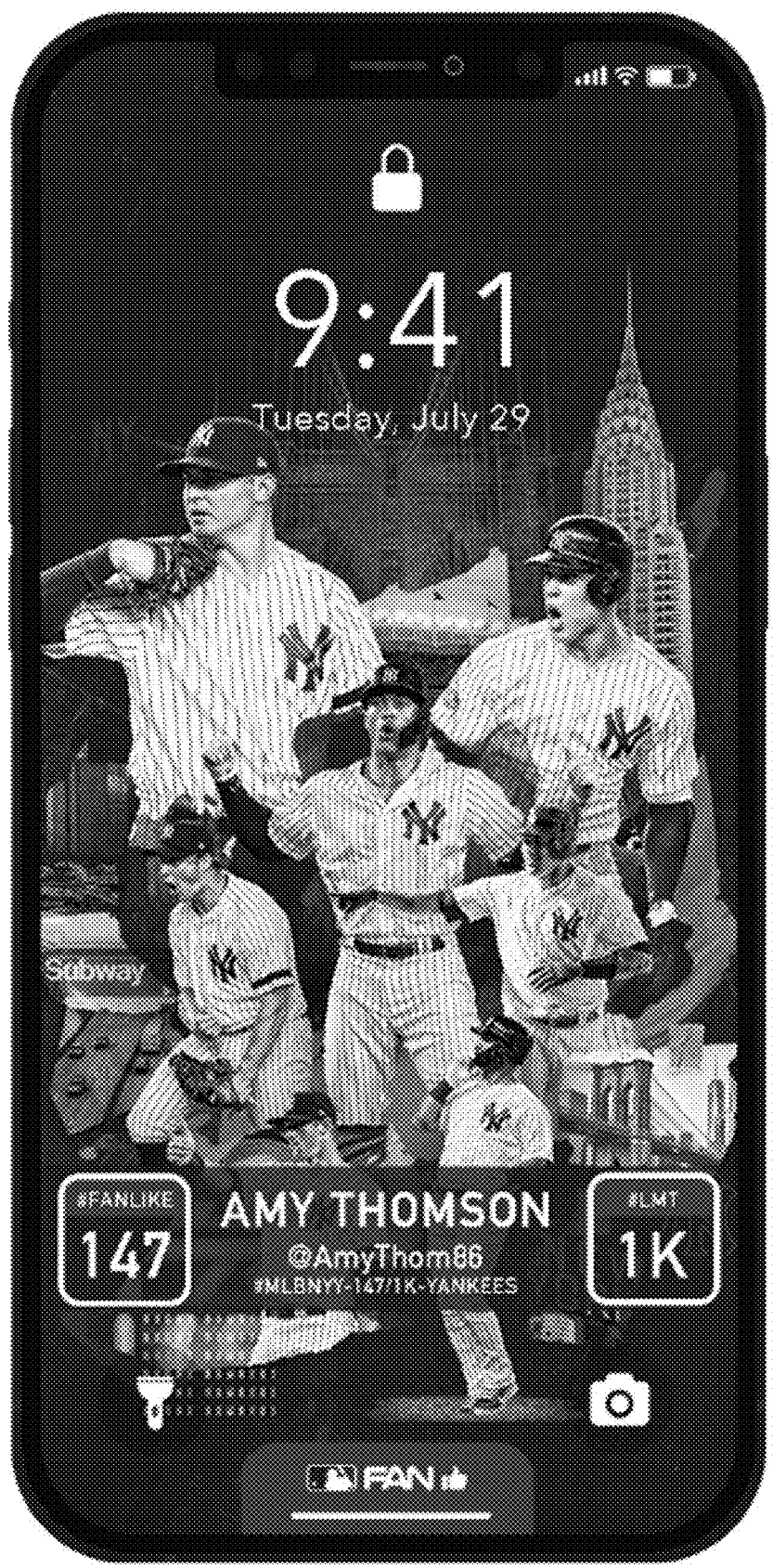
FIG. 26 illustrates a certificate for a lock screen according to one embodiment of the present invention.

FIG. 26 illustrates a certificate for a lock screen according to one embodiment of the present invention. The lock screen certificate includes an image, a fan identification portion including the name of the fan, the ID of the fan, and a lock screen certificate code. In one embodiment, the ID of the fan does not include a unique code such as a QR code. The lock screen certificate includes a number of the lock screen certificate out of all the number of lock screen certificates of the same type that are issued, and the maximum number of lock screen certificates of the same type that are issued. In one embodiment, the certificate for the lock screen is distributed at an event to devices associated with accounts determined to be at the event. For example, a Super Bowl lock screen certificate is distributed to all accounts determined to be present at the Super Bowl, or to the first number of accounts which accept an offer for the lock screen certificate or request the lock screen certificate, such as the first one thousand accounts. Alternatively, the lock screen certificate is automatically distributed to accounts associated with mobile devices determined to be present at an event, or mobile devices in a certain section of an event such as a student section for a college game, a certain section of a stadium or venue, or a fan appreciation event not in a stadium or a venue. In one embodiment, the location of mobile devices is determined via any method of geolocation described herein, including geofencing, cellular triangulation, and/or GPS. Accounts are operable to be selected to receive a lock screen certificate based on a fan status in one embodiment. While only higher-ranking fans are provided with a lock screen certificate in one embodiment, the present invention is operable to select lower ranking fans or new accounts as determined by the date of account creation or the date of account creation included in the user ID to engage newer fans. The lock screen certificate is operable to depict an image showing a particular game or a milestone for a team, such as a season opener, a record number of points scored or another similar metric, an addition of a player to the roster, the addition of a coach, a retirement of a player or a coach, or any other notable milestone or event. In one embodiment, the lock screen certificate is free to the accounts to which it is distributed. The lock screen certificate is operable to be traded or sold to another account in one embodiment. In yet another embodiment, an NFT is operable to be created from the lock screen certificate utilizing the NFT creation process described herein.

Figure 27:
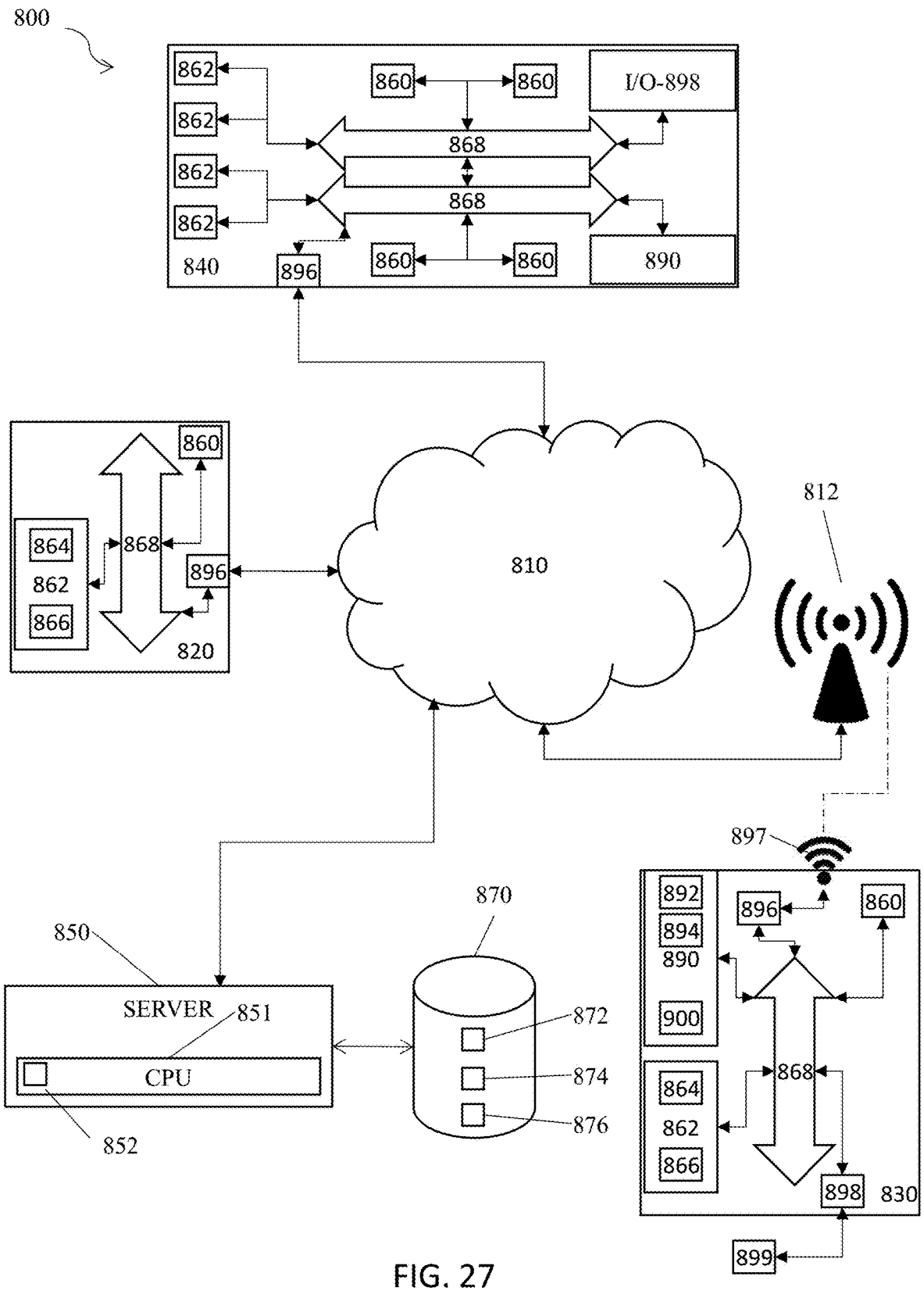
FIG. 27 is a schematic diagram of an embodiment of the present invention.

FIG. 27 is a schematic diagram of an embodiment of the invention illustrating a computer system, generally described as 800, having a network 810, a plurality of computing devices 820, 830, 840, a server 850, and a database 870.

The server 850 is constructed, configured, and coupled to enable communication over a network 810 with a plurality of computing devices 820, 830, 840. The server 850 includes a processing unit 851 with an operating system 852. The operating system 852 enables the server 850 to communicate through network 810 with the remote, distributed user devices. Database 870 is operable to house an operating system 872, memory 874, and programs 876.

In one embodiment of the invention, the system 800 includes a network 810 for distributed communication via a wireless communication antenna 812 and processing by at least one mobile communication computing device 830. Alternatively, wireless and wired communication and connectivity between devices and components described herein include wireless network communication such as WI-FI, WORLDWIDE INTEROPERABILITY FOR MICROWAVE ACCESS (WIMAX), Radio Frequency (RF) communication including RF identification (RFID), NEAR FIELD COMMUNICATION (NFC), BLUETOOTH including BLUETOOTH LOW ENERGY (BLE), ZIGBEE, Infrared (IR) communication, cellular communication, satellite communication, Universal Serial Bus (USB), Ethernet communications, communication via fiber-optic cables, coaxial cables, twisted pair cables, and/or any other type of wireless or wired communication. In another embodiment of the invention, the system 800 is a virtualized computing system capable of executing any or all aspects of software and/or application components presented herein on the computing devices 820, 830, 840. In certain aspects, the computer system 800 is operable to be implemented using hardware or a combination of software and hardware, either in a dedicated computing device, or integrated into another entity, or distributed across multiple entities or computing devices.

By way of example, and not limitation, the computing devices 820, 830, 840 are intended to represent various forms of electronic devices including at least a processor and a memory, such as a server, blade server, mainframe, mobile phone, personal digital assistant (PDA), smartphone, desktop computer, netbook computer, tablet computer, workstation, laptop, and other similar computing devices. The components shown here, their connections and relationships, and their functions, are meant to be exemplary only, and are not meant to limit implementations of the invention described and/or claimed in the present application.

In one embodiment, the computing device 820 includes components such as a processor 860, a system memory 862 having a random access memory (RAM) 864 and a read-only memory (ROM) 866, and a system bus 868 that couples the memory 862 to the processor 860. In another embodiment, the computing device 830 is operable to additionally include components such as a storage device 890 for storing the operating system 892 and one or more application programs 894, a network interface unit 896, and/or an input/output controller 898. Each of the components is operable to be coupled to each other through at least one bus 868. The input/output controller 898 is operable to receive and process input from, or provide output to, a number of other devices 899, including, but not limited to, alphanumeric input devices, mice, electronic styluses, display units, touch screens, signal generation devices (e.g., speakers), or printers.

By way of example, and not limitation, the processor 860 is operable to be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that can perform calculations, process instructions for execution, and/or other manipulations of information.

In another implementation, shown as 840 in FIG. 27, multiple processors 860 and/or multiple buses 868 are operable to be used, as appropriate, along with multiple memories 862 of multiple types (e.g., a combination of a DSP and a microprocessor, a plurality of microprocessors, one or more microprocessors in conjunction with a DSP core).

Also, multiple computing devices are operable to be connected, with each device providing portions of the necessary operations (e.g., a server bank, a group of blade servers, or a multi-processor system). Alternatively, some steps or methods are operable to be performed by circuitry that is specific to a given function.

According to various embodiments, the computer system 800 is operable to operate in a networked environment using logical connections to local and/or remote computing devices 820, 830, 840 through a network 810. A computing device 830 is operable to connect to a network 810 through a network interface unit 896 connected to a bus 868. Computing devices are operable to communicate communication media through wired networks, direct-wired connections or wirelessly, such as acoustic, RF, or infrared, through an antenna 897 in communication with the network antenna 812 and the network interface unit 896, which are operable to include digital signal processing circuitry when necessary. The network interface unit 896 is operable to provide for communications under various modes or protocols.

In one or more exemplary aspects, the instructions are operable to be implemented in hardware, software, firmware, or any combinations thereof. A computer readable medium is operable to provide volatile or non-volatile storage for one or more sets of instructions, such as operating systems, data structures, program modules, applications, or other data embodying any one or more of the methodologies or functions described herein. The computer readable medium is operable to include the memory 862, the processor 860, and/or the storage media 890 and is operable be a single medium or multiple media (e.g., a centralized or distributed computer system) that store the one or more sets of instructions 900. Non-transitory computer readable media includes all computer readable media, with the sole exception being a transitory, propagating signal per se. The instructions 900 are further operable to be transmitted or received over the network 810 via the network interface unit 896 as communication media, which is operable to include a modulated data signal such as a carrier wave or other transport mechanism and includes any delivery media. The term "modulated data signal" means a signal that has one or more of its characteristics changed or set in a manner as to encode information in the signal.

Storage devices 890 and memory 862 include, but are not limited to, volatile and non-volatile media such as cache, RAM, ROM, EPROM, EEPROM, FLASH memory, or other solid state memory technology; discs (e.g., digital versatile discs (DVD), HD-DVD, BLU-RAY, compact disc (CD), or CD-ROM) or other optical storage; magnetic cassettes, magnetic tape, magnetic disk storage, floppy disks, or other magnetic storage devices; or any other medium that can be used to store the computer readable instructions and which can be accessed by the computer system 800.

In one embodiment, the computer system 800 is within a cloud-based network. In one embodiment, the server 850 is a designated physical server for distributed computing devices 820, 830, and 840. In one embodiment, the server 850 is a cloud-based server platform. In one embodiment, the cloud-based server platform hosts serverless functions for distributed computing devices 820, 830, and 840.

In another embodiment, the computer system 800 is within an edge computing network. The server 850 is an edge server, and the database 870 is an edge database. The edge server 850 and the edge database 870 are part of an edge computing platform. In one embodiment, the edge server 850 and the edge database 870 are designated to distributed computing devices 820, 830, and 840. In one embodiment, the edge server 850 and the edge database 870 are not designated for distributed computing devices 820, 830, and 840. The distributed computing devices 820, 830, and 840 connect to an edge server in the edge computing network based on proximity, availability, latency, bandwidth, and/or other factors.

It is also contemplated that the computer system 800 is operable to not include all of the components shown in FIG. 27, is operable to include other components that are not explicitly shown in FIG. 27, or is operable to utilize an architecture completely different than that shown in FIG. 27. The various illustrative logical blocks, modules, elements, circuits, and algorithms described in connection with the embodiments disclosed herein are operable to be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans are operable to implement the described functionality in varying ways for each particular application (e.g., arranged in a different order or partitioned in a different way), but such implementation decisions should not be interpreted as causing a departure from the scope of the present invention.

The platform of the present is operable to utilize a plurality of learning techniques including, but not limited to, machine learning (ML), artificial intelligence (AI), deep learning (DL), neural networks (NNs), artificial neural networks (ANNs), support vector machines (SVMs), Markov decision process (MDP), and/or natural language processing (NLP). The platform is operable to use any of the aforementioned learning techniques alone or in combination.

Further, the platform is operable to utilize predictive analytics techniques including, but not limited to, machine learning (ML), artificial intelligence (AI), neural networks (NNs) (e.g., long short term memory (LSTM) neural networks), deep learning, historical data, and/or data mining to make future predictions and/or models. The platform is preferably operable to recommend and/or perform actions based on historical data, external data sources, ML, AI, NNs, and/or other learning techniques. The platform is operable to utilize predictive modeling and/or optimization algorithms including, but not limited to, heuristic algorithms, particle swarm optimization, genetic algorithms, technical analysis descriptors, combinatorial algorithms, quantum optimization algorithms, iterative methods, deep learning techniques, and/or feature selection techniques.

Certain modifications and improvements will occur to those skilled in the art upon a reading of the foregoing description. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

The invention claimed is:

1. A system for facilitating fan engagement comprising:
at least one server computer including a processor, a memory, and at least one database; and
at least one mobile device, wherein the at least one mobile device includes an application and at least one sensor;
wherein the at least one database includes device and user data, and where the device and user data includes location data;
wherein the application includes a social network platform providing a social network for a user account;
wherein the user data further includes fan data;
wherein the fan data includes preference data associated with the user account for at least one group;
wherein the fan data further includes a degree of interest of the user account corresponding to the at least one group, a timeline of interest of the user account with regard to the at least one group, and at least one reason for interest of the user account with regard to the at least one group;
wherein the degree of interest of the user account corresponding to the at least one group is determined based at least on how much time the user account spends accessing online forums related to the at least one group;
wherein a profile associated with a second user account is operable to be accessed through the social network platform of the application upon the at least one mobile device scanning a unique code associated with the second user account;

wherein scanning the unique code associated with the second user account causes the second user account to be added to the social network for the user account;

wherein scanning the unique code associated with the second user account displays a double sided unique fan card associated with the second user account, wherein a first side of the double sided unique fan card includes a first image, a team the second user account selected, and a year the second user account created the double sided unique fan card, wherein a second side of the double sided unique fan card includes a second image and a city of residence of the second user account;

wherein the user account associated with the at least one mobile device includes the user data, where a fan status of a user is created, validated, updated, and certified using the fan data; and wherein the at least one server computer is operable to receive an input from the at least one mobile device, and where the input from the at least one mobile device includes a request to mint at least one non-fungible token (NFT).

2. The system of claim 1, wherein the at least one mobile device is a smart phone, a mobile phone, a laptop computer, a tablet, or a phablet.

3. The system of claim 1, wherein the application includes a marketplace providing digital collectibles, wherein the digital collectibles include a third image, a video, an audio file, and/or a graphics interchange format (GIF) file.

4. The system of claim 1, wherein the social network platform provides for buying, selling, and/or exchanging NFTs between user accounts.

5. A system for facilitating fan engagement comprising:
at least one server computer including a processor, a memory, and at least one database; and
at least one mobile device, wherein the at least one mobile device includes an application;
wherein the at least one database includes device data and user data;
wherein a user account associated with the at least one mobile device includes the user data;
wherein the user data further includes fan data;
wherein the fan data includes preference data associated with the user account for at least one group;
wherein the fan data further includes a degree of interest of the user account corresponding to the at least one group, a timeline of interest of the user account with regard to the at least one group, and at least one reason for interest of the user account with regard to the at least one group;
wherein the degree of interest of the user account corresponding to the at least one group is determined based at least on how much time the user account spends accessing online forums related to the at least one group;
wherein a fan status of a user is created, validated, updated, and certified using the fan data; and
wherein the user data further includes a unique fan identification (ID) and a unique code, wherein the unique code links to a profile associated with the user account when scanned or read by a second device;
wherein scanning the unique code with the second device displays a unique fan card associated with the user account, wherein the unique fan card includes a team the user account selected, and a year the user account created the unique fan card;
wherein a non-fungible token (NFT) is operable to be minted based on an image selected on the at least one mobile device; and
wherein the NFT is operable to be sold through a marketplace of the application.

6. The system of claim 5, wherein the NFT includes location data of the mobile device, the unique fan identification, or the unique code.

7. The system of claim 5, wherein a physical, printed image of the image associated with the NFT is operable to be created.

* * * * *